(12) United States Patent
Li et al.

(10) Patent No.: US 11,540,314 B2
(45) Date of Patent: Dec. 27, 2022

(54) DEVICE, SYSTEM AND METHOD TO COORDINATE SIMULTANEOUS DOWNLINK WIRELESS TRANSMISSIONS

(71) Applicant: Intel Corporation, Santa Clara, CA (US)

(72) Inventors: Qinghua Li, San Ramon, CA (US); Po-Kai Huang, San Jose, CA (US); Laurent Cariou, Portland, OR (US); Robert Stacey, Portland, OR (US); Feng Jiang, Sunnyvale, CA (US); Xiaogang Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/643,201

(22) PCT Filed: Sep. 28, 2017

(86) PCT No.: PCT/US2017/053978
§ 371 (c)(1),
(2) Date: Feb. 28, 2020

(87) PCT Pub. No.: WO2019/066850
PCT Pub. Date: Apr. 4, 2019

(65) Prior Publication Data
US 2020/0214034 A1 Jul. 2, 2020

(51) Int. Cl.
*H04W 74/00* (2009.01)
*H04W 72/04* (2009.01)
*H04W 72/12* (2009.01)

(52) U.S. Cl.
CPC ..... *H04W 74/006* (2013.01); *H04W 72/0453* (2013.01); *H04W 72/1273* (2013.01)

(58) Field of Classification Search
None
See application file for complete search history.

(56) References Cited

U.S. PATENT DOCUMENTS

2014/0362840 A1* 12/2014 Wong ............... H04W 72/12
  370/338
2015/0288428 A1* 10/2015 Choi ............... H04B 7/0408
  370/329

(Continued)

FOREIGN PATENT DOCUMENTS

WO  2017070487 A1  4/2017
WO  2017152962 A1  9/2017

OTHER PUBLICATIONS

International Search Report for PCT/US2017/053978, dated Jun. 21, 2018, 3 pages.

(Continued)

*Primary Examiner* — The Hy Nguyen
(74) *Attorney, Agent, or Firm* — Alliance IP, LLC

(57) ABSTRACT

A wireless communication device, system and method. The device comprises a memory and processing circuitry coupled to the memory, the memory storing instructions, the processing circuitry to execute the instructions to decode an access point (AP) trigger frame from a coordinator AP including information on respective resource allocations to a plurality of APs (AP resource allocations) for simultaneous downlink (DL) data transmissions to a plurality of wireless stations (scheduled STAs). The processing circuitry is to cause transmission of a wireless frame to a plurality of scheduled STAs associated with the corresponding AP (associated scheduled STAs). The wireless frame includes information on a resource allocation by the coordinator AP to the corresponding AP for the simultaneous DL transmissions, and information on respective resource allocations to the (Continued)

associated scheduled STAs for data transmission from the corresponding AP.

14 Claims, 10 Drawing Sheets

(56) References Cited

U.S. PATENT DOCUMENTS

| | | | | |
|---|---|---|---|---|
| 2016/0021568 A1* | 1/2016 | Yu | ........................ | H04B 7/0811 |
| | | | | 370/329 |
| 2016/0081087 A1* | 3/2016 | Kwon | ................... | H04L 5/0094 |
| | | | | 370/329 |
| 2016/0088602 A1 | 3/2016 | Seok | | |
| 2016/0119933 A1* | 4/2016 | Merlin | .............. | H04W 72/0446 |
| | | | | 370/312 |
| 2016/0143026 A1* | 5/2016 | Seok | ................... | H04W 72/046 |
| | | | | 370/329 |
| 2016/0204912 A1* | 7/2016 | Sun | ........................ | H04L 1/0042 |
| | | | | 375/302 |
| 2016/0285526 A1* | 9/2016 | Hedayat | ................ | H04B 7/0452 |
| 2016/0359653 A1* | 12/2016 | Lee | ..................... | H04L 27/0006 |
| 2016/0360443 A1 | 12/2016 | Hedayat | | |
| 2017/0048048 A1* | 2/2017 | Seok | ...................... | H04L 1/1896 |
| 2017/0079011 A1* | 3/2017 | Kenney | ............... | H04W 72/042 |
| 2017/0318134 A1* | 11/2017 | Du | ........................ | H04W 72/12 |
| 2018/0206189 A1* | 7/2018 | Oh | ........................ | H04L 5/0039 |
| 2018/0263045 A1* | 9/2018 | Zhou | .................... | H04B 7/0617 |
| 2019/0215873 A1* | 7/2019 | Lalam | ............... | H04W 74/0833 |

OTHER PUBLICATIONS

PCT International Preliminary Reporton Patentability in PCT International Application Serial No. PCT/US2017/053978 dated Apr. 9, 2020 (5 pages).

Written Opinion of the International Search Authority for PCT/US2017/053978, dated Jun. 21, 2018, 4 pages.

* cited by examiner

900 decoding a wireless frame addressed to a plurality of STAs, respective groups of the STAs being associated with respective ones of a plurality of access points (APs), the frame including simultaneous downlink (DL) transmissions from the plurality of APs to the plurality of STAs, the frame further including information on resource allocations by a coordinator AP to respective ones of the plurality of APs (AP resource allocations) for simultaneous DL transmissions, and information on respective resource allocations for data transmissions from each of the plurality of APs to respective ones of the groups of STAs (STA resource allocations), decoding including:
    determining an AP resource allocation of an AP associated with a STA that corresponds to the device; and
    within the AP resource allocation, decoding a STA resource allocation for the STA that corresponds to the device
902 decoding data in the data transmissions based on the AP resource allocation and on the associated STA resource allocation
904 causing transmission of an uplink (UL) acknowledgment frame to the AP associated with the STA that corresponds to the device
906

DEVICE, SYSTEM AND METHOD TO COORDINATE SIMULTANEOUS DOWNLINK WIRELESS TRANSMISSIONS

CROSS-REFERENCE TO RELATED APPLICATIONS

This application is a national stage application under 35 U.S.C. § 371 of PCT International Application Serial No. PCT/US2017/053978, filed on Sep. 28, 2017, and entitled DEVICE, SYSTEM AND METHOD TO COORDINATE SIMULTANEOUS DOWNLINK WIRELESS TRANSMISSION. The disclosure of the prior application is considered part of and is hereby incorporated by reference in its entirety in the disclosure of this application.

TECHNICAL FIELD

Embodiments relate to wireless communication. More specifically, an exemplary aspect is directed toward wireless communications systems and even more specifically to the Institute of Electrical and Electronics Engineers (IEEE) 802.11 wireless communication set of standards and amendments. Exemplary aspects are at least directed toward devices, products, systems and methods compliant with the IEEE 802.11n/ac/ax and next generation set of amendments, and in general any wireless communications system or protocol, such as 4G, 4G LTE, 5G and later, and the like.

BACKGROUND

The Institute of Electrical and Electronics Engineers (IEEE) 802.11ax amendments envisage improving the overall system throughout for a Wi-Fi network by introducing the Orthogonal Frequency Division Multiple Access (OFDMA) technique, which affords an Access Point (AP) the ability to: (1) transmit downlink (DL) data frames to up to nine users over non-overlapping Resource Units (RUs) within a 20 MHz wireless channel simultaneously, up to 37 users over non-overlapping Resource Units (RUs) within a 80 MHz wireless channel simultaneously, and more for 80+80 MHz and 160 MHz wireless channels; and (2) trigger up to nine users within a 20 MHz channel, up to 37 users within a 80 MHz channel and more within 80+80 MHz and 160 MHz wireless channels, to transmit uplink (UL) data frames to the AP simultaneously.

However, existing Wi-Fi systems do not currently allow an effective and efficient mechanism to coordinate simultaneous transmissions from multiple APs to respective associated STAs.

BRIEF DESCRIPTION OF THE DRAWINGS

The present disclosure is illustrated by way of example and not limitation in the figures of the accompanying drawings, in which like references indicate similar elements and in which:

FIG. 9 illustrates a flow-chart of a method according to another demonstrative embodiment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some demonstrative embodiments may be included in, or substituted for, those of other embodiments. Embodiments set forth in the claims encompass all available equivalents of those claims.

Figure 1:
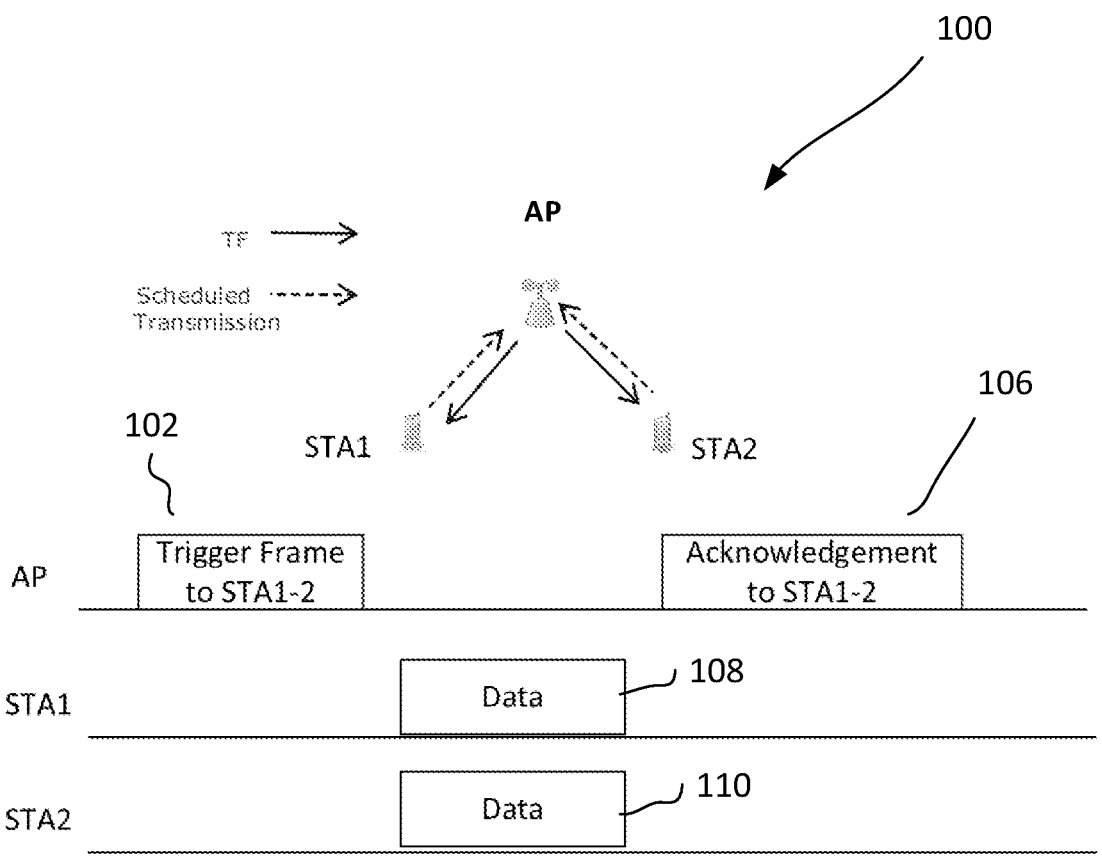
FIG. 1 illustrates a wireless network and a trigger frame exchange within the wireless network.

IEEE 802.11ax introduces a trigger frame to solicit simultaneous uplink transmissions in a basic service set (BSS). A trigger frame, as sent by a wireless access point (AP) may allow user devices (referred to as STAs) solicited by the trigger frame to have time and frequency synchronization with respect to their respective uplink (UL) transmissions to the AP so that interference as between those UL transmissions can be mitigated and throughput increased as a result. The UL transmissions may use OFDMA and/or Multi-User (MU) Multiple-Input Multiple Output (MIMO) (MU-MIMO). Referring to FIG. 1 by way of example, an AP may be communicating with two STAs STA1 and STA2. The AP may send a trigger frame 102 that may be received by STA1 and STA2. STA1 and STA2 then send respective UL transmissions (e.g., data frames 108 and 110) using UL MU-MIMO to the AP according to resource allocations including scheduling information noted within the trigger frame, in this way avoiding interference with one another. As a result, OFDMA or MU-MIMO UL transmission can be effected through a trigger frame to increase system throughput. However, for the Wi-Fi transmission, there is usually more than one AP in the neighborhood of STA1 and STA2.

In a Wi-Fi environment, there may be more than one AP present. In existing Wi-Fi environments, different APs typically perform channel access at different times in order to avoid interference with one another, and, therefore, simultaneous downlink (DL) transmissions using OFDMA and/or MU-MIMO are not available. One suggestion introduced for the next generation of 802.11 amendments includes a modified version of the 802.11ax trigger frame, a new trigger frame or an "AP trigger frame," to expand the existing 802.11ax concept of a trigger frame. The AP trigger frame is to trigger simultaneous transmissions from multiple APs in the DL direction. Use of an AP trigger frame may facilitate fractional frequency reuse used in networks as shown by way of example in FIG. 4, which will be described in further detail below.

Figure 2:
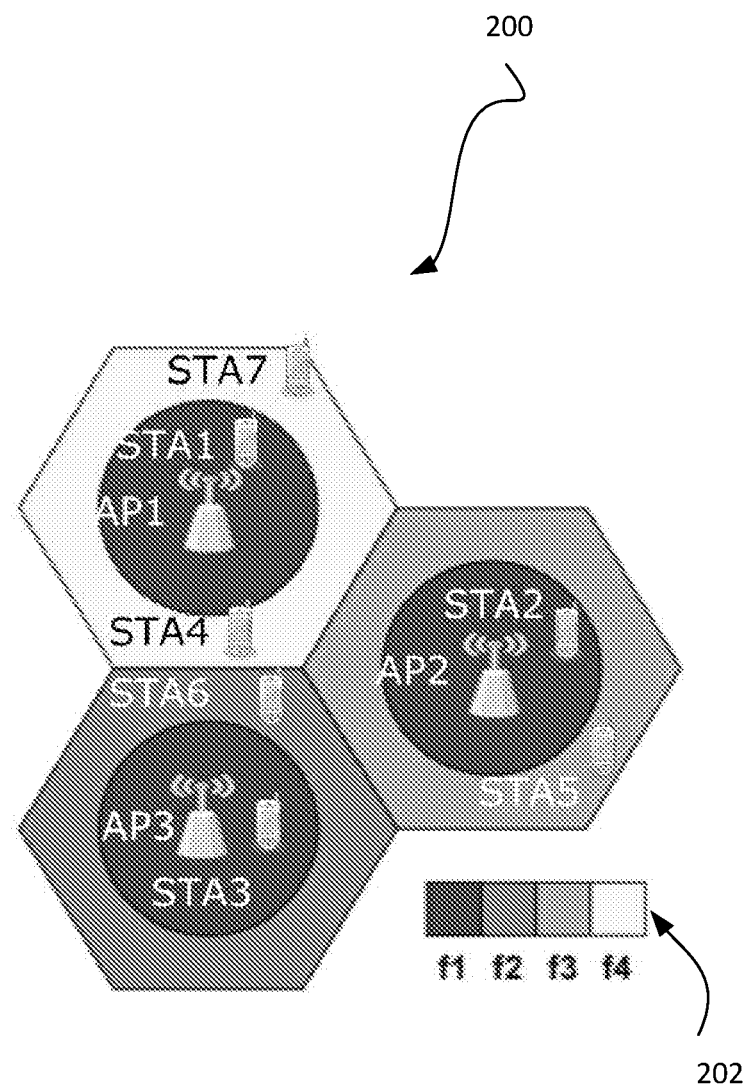
FIG. 2 illustrates a wireless network including a plurality of APs and a plurality of STAs, each AP having a group of STAs associated therewith.

With respect to a wireless environment where AP trigger frames may be sent, we now refer to FIG. 2. FIG. 2 schematically illustrates a network in the form of Extended Service Set (ESS) 200, in accordance with some demonstrative embodiments. Embodiments are not limited to ESS networks, however, and may include any other wireless network as would be recognized by a skilled person.

As shown in FIG. 2, in some demonstrative embodiments, ESS 200 may include one or more STAs capable of communicating content, data, information, audio, video, and/or signals via a wireless medium, such as mobile/portable and non-mobile wireless communication stations STA1, STA2, STA3, STA4, STA5, STA6 and STA7. The ESS may be formed according to first wireless communication protocol, such as, for example, WLAN, or another wireless communication protocol. FIG. 2 additionally shows three access points (APs) AP1, AP2, and AP3, each forming, along with STAs associated therewith, a basic service set (BSS) of the ESS. The APs in FIG. 2 may be networked with one another in a well-known manner, such as, for example, by way of a wired distribution system (DS) or "backbone" (not shown), or in any other manner as would be recognized by a person skilled in the art. A networking of the APs with one another, such as through a backbone, or such as by way of a wireless medium, would allow the communication of an AP trigger frame as between the APs in the ESS.

As shown in FIG. 2 by virtue of hexagonal cell shapes for each BSS, AP1, STA1, STA4, and STA7 are associated with one another and form BSS1, while AP2, STA2, and STA5 are associated with one another and form BSS2, and AP3, STA3 and STA6 are associated with one another and form BSS3. Networks according to some demonstrative embodiments, however, are not limited to the number, configuration, or types of access points (APs) or STAs as shown in FIG. 1, but may include any number of wireless communication stations, whether mobile or not, and any number of BSSs, whether or not in an ESS, forming a wireless network together as would be recognized by a person skilled in the art. As further shown in FIG. 2, each of the shown BSS' may operate using a number of frequencies for example from the set 202 of frequencies f1-f4 in FIG. 2. For example, as depicted by way of example, BSS1 may use frequency f1 to reach STA1, and frequency f4 to reach STA4 and STA7. BSS2 may use frequency f1 to reach STA2, and frequency f3 to reach STA5.

Hereinafter, the multiple APs that are to receive the new trigger frame from a coordinator AP will be referred to as "scheduled APs." For each AP including the coordinator AP and the scheduled APs, the set of STAs that are to receive data in a simultaneous DL transmission from the APs will be referred to as "scheduled STAs." Referring to FIG. 2 by way of example, if AP1 is the coordinator AP, then AP2 and AP3 would represent the scheduled APs, and, for AP2, STA2 and STA5 would be the scheduled STAs (assuming AP2 is to have data buffered for both of these STAs), and for AP3, STA3 and STA6 would be the scheduled STAs (assuming again that AP3 is to have data buffered for both STA3 an STA6). In addition, for AP1, the scheduled STAs would be STA1, STA4 and STA7 (assuming again that AP1 is to have data buffered for both STA1, STA4 and STA7). If there are STAs within range of an AP that however do not have data to be transmitted to them by that AP, then those STAs will not be referred to herein as "scheduled STAs". Moreover, scheduled STAs that are associated with a given AP will be referred to herein as "associated scheduled STAs." In addition, the new trigger frame sent from the coordinator AP to the scheduled APs will be referred to as the "AP trigger frame." As used herein, a "simultaneous" transmission refers to transmissions, by multiple APs, of information to respective multiple STAs at the same time (i.e. transmissions that overlap at least partially in the time domain).

In some demonstrative embodiments, the wireless medium may include, for example, a radio channel, an RF channel, a Wireless Fidelity (WLAN) channel, a cellular channel, an IR channel, a Low-Power Wake-Up channel, and the like. One or more elements of ESS 100 may optionally be capable of communicating over any suitable wired communication links.

In some demonstrative embodiments, a STA within a wireless network may include, for example, user equipment (UE), a mobile device (MD), a WLAN STA, a mobile computer, a laptop computer, an Internet of Things (IoT) device, a sensor device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device that incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a smartphone, or the like.

In some demonstrative embodiments, one or more of the plurality of STAs may include, may perform a role of, and/or may perform the functionality of, an access point (AP) station (STA) such as a soft AP, or of a non-AP STA.

In one example, STA may include a logical entity that is a singly addressable instance of a medium access control (MAC) and physical layer (PHY) interface to the wireless medium. The STA may perform any other additional or alternative functionality.

In one example, an AP may include an entity that contains a STA, and provides access to distribution services, via the wireless medium for associated STAs. The AP may perform any other additional or alternative functionality, and may be wired to a router, or may be an integral part of a router, to provide connection to a network.

In one example, a non-AP STA may include a STA that is not contained within an AP. The non-AP STA may perform any other additional or alternative functionality.

Referring still to FIG. 2, to enable simultaneous transmission from different APs to their associated STAs with time synchronization and frequency synchronization to avoid interference, a coordinator AP, such as AP1 in FIG. 2, may transmit an AP trigger to the other APs, such as AP2 and AP3. For example, for AP1, AP2, and AP3 to transmit to STA1, STA2, and STA3, a simultaneous downlink transmission coordination system may facilitate for AP1, AP2, and AP3 to use the same frequency, for example, frequency f1, since STA1, STA2, and STA3 is close to AP1, AP2, and AP3. For AP1, AP2, and AP3 to transmit STA4, STA5, STA6 and STA7, an AP trigger frame may be sent from one of the APs as a coordinator AP, for example from AP1, to facilitate the use of different frequencies to each different STAs, for example, to use frequency f4 for AP1, frequency f3 for AP2, and frequency f2 for AP3. It is understood that the above descriptions are for purposes of illustration and are not meant to be limiting with respect to the type or arrangement of the ESS or of BSS' shown.

Figure 3:
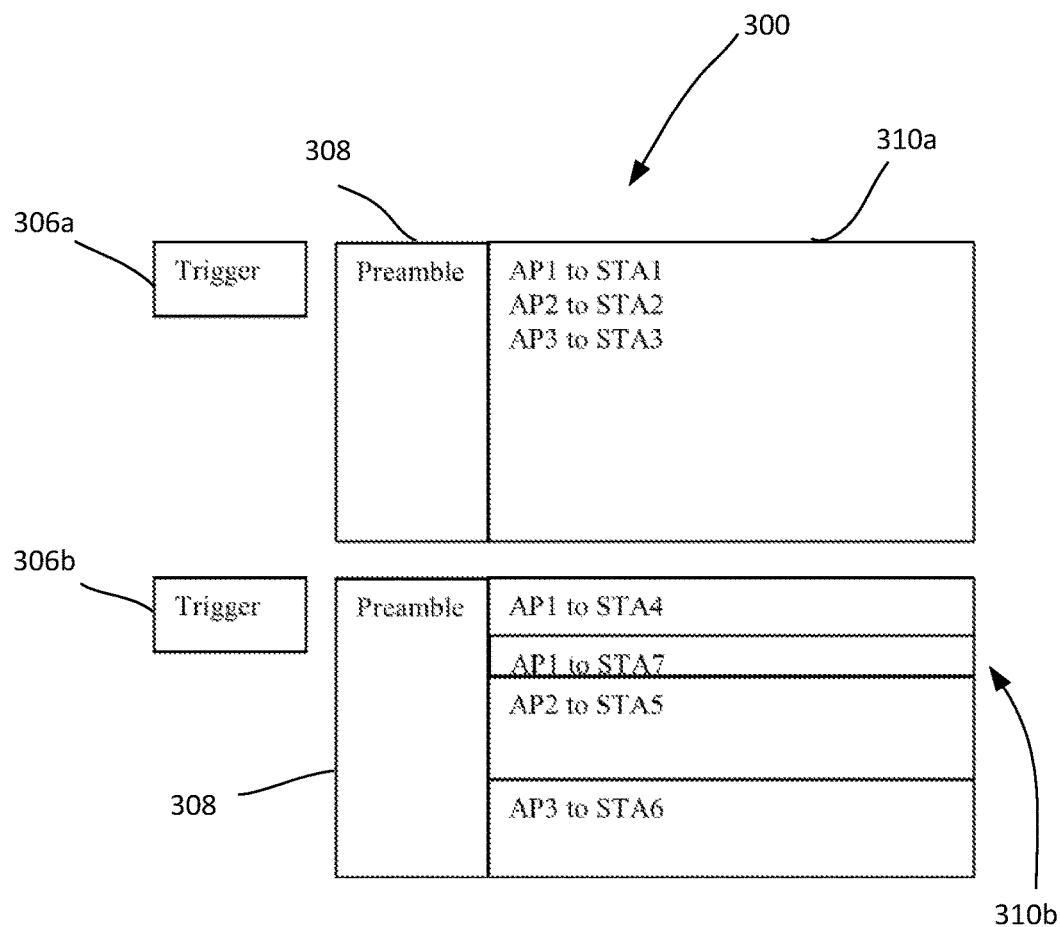
FIG. 3 illustrates two variants of an access point trigger frame according to some embodiments.

FIG. 3 depicts an illustrative schematic diagram of an AP trigger frame 306a/306b in two formats, and the subsequent, multi-AP, simultaneous, downlink transmissions. The first format is of an AP trigger frame 306a and is followed by a set of multi-AP simultaneous transmissions that use the same frequency band (such as, for example, frequency f1 from FIG. 2) to transmit information to all scheduled APs, such as AP2 and AP3 of ESS 200 of FIG. 2 (see top of FIG. 3, which shows an AP trigger frame format using the same frequency band to transmit information to all scheduled APs—hereinafter a "spatial-reuse AP trigger frame"). The second format is of an AP trigger frame 306b that is followed by a set of multi-AP simultaneous transmissions that use orthogonal frequency division multiple access (OFDMA). AP trigger frames may be using different frequency bands for each respective one of the scheduled APs, for example, frequency f4 for AP1, frequency f3 for AP2, and frequency f2 for AP3. The above is to allow different APs to coordinate transmission to different close and far away STAs and to increase network throughput. An AP may use the combination of spatial reuse and frequency division multi-access to serve the STAs in the BSS. As seen in FIG. 3, each trigger frame 306a/306b includes a preamble 308 portion which includes information common to all scheduled STAs in the ESS for which the coordinator AP and scheduled AP have buffered data (i.e. common to all scheduled STAs). After the preamble, the AP trigger frame includes a payload portion or AP-specific portion 310a/310b. In the top portion of FIG. 3, the spatial-reuse AP trigger frame 306a includes a payload portion 310a within a single frequency band, for example frequency band f4 of FIG. 2, payload portion 310a including data to transmit scheduled STAs.

Figure 4:
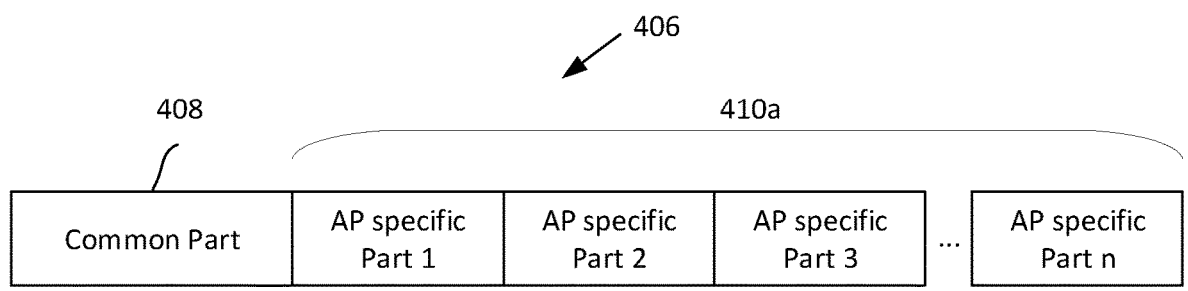
FIG. 4 illustrates a variant of an access point trigger frame according to one embodiment.

An example of the variant at the bottom portion of FIG. 3 may be found in FIG. 4. Here, the AP specific portions each occupy the same frequency band, and each occupy a distinct subfield, although embodiments are not so limited.

In the bottom portion of FIG. 3, the OFDMA AP trigger frame includes AP specific information on the same frequency band, with an AP resource allocation for each AP being in a distinct field.

As used herein, "common" used in the context of information or a portion of a frame, refers to information or a portion of a frame that is sent or is to be sent on a resource (such as on one or more RUs or on a frequency) that is directed to a plurality of devices, such as to a plurality of APs or a plurality of STAs. All of the information within a common portion may be slated to be decoded by each of the plurality of devices to which the common portion is sent (such as, for example, a legacy header or a high efficiency (HE) header, and/or each of the plurality of devices may decode a part of the common portion that is relevant to it.

As used herein, "decoding" or "processing" a frame, a transmission, a packet, or a portion of the same, refers to: (1) either completely decoding or processing the wireless frame/transmission/packet/portion of the same, or (2) partially decoding or processing the wireless frame/transmission/packet/portion of the same.

Referring now to FIG. 4, a spatial-reuse trigger frame 406 similar to spatial-reuse trigger frame 306a may include a common part 408, and a payload portion 410a which uses the same frequency to transmit resource allocation information to the various scheduled APs. FIG. 4 is the example of the trigger frames 306a and 306b for both the spatial reuse mode and the OFDMA mode. In the example of FIG. 4, the spatial-reuse trigger frame 406 partitions the information for each scheduled AP in the time domain, with n total APs and AP-specific portions corresponding to AP1 through APn.

Referring back to FIG. 3, the AP trigger frame 306a/306b may include information in its preamble 308 common to all scheduled APs (common portion). Such information may, in addition to the information in the common portion of an 802.11ax trigger frame, include, by way of example, information on a duration of DL data frames transmitted simultaneously by the APs, and information on a duration of acknowledgment frames to be sent by the scheduled STAs. The AP-specific portion or payload 310a/310b may include information specific to each scheduled AP, including, for example, information on an identification (ID) of the scheduled AP, and information on a transmission power level to be effected by each AP for its portion of the simultaneous DL transmissions to its associated scheduled STAs. The power level of the DL transmission may alternatively be included in the common portion of an AP trigger frame. The AP-specific portion, especially in the case of an OFDMA AP trigger frame, may include AP resource allocation information from the coordinator AP for each scheduled AP. In a spatial-reuse AP trigger frame, the per scheduled AP resource allocation may be included in the common portion or AP-specific portion. For the OFDMA AP trigger frame shown at the bottom portion of FIG. 3, each scheduled AP may look to its resource allocation within the OFDMA AP trigger frame in order to determine its resource allocation for transmission to its scheduled STAs during the simultaneous DL transmissions. Thereafter, each scheduled AP may determine, based on its resource allocation within the OFDMA AP trigger frame, the resource allocation attributable to its DL transmissions to its associated scheduled STAs.

By "resource allocation information," what is meant herein is information including information on resources within the frequency domain, within the time domain and/or within P-matrix rows—such as information on RUs or tone segments to be allocated to a scheduled AP by the coordinator AP, and/or to be allocated to scheduled STAs by either the associated scheduled AP or the coordinator AP or both.

A problem arises from the use of an AP trigger frame where the scheduled STA would need to identify the resource allocation of its corresponding AP in the simultaneous DL transmissions from the scheduled APs. Scheduled STAs of each scheduled AP may not be able to receive the AP trigger frame from the coordinator AP with all of the resource allocation information, for example as a result of path loss, and, even if they did, resource allocation information that pertains specifically to their own resources (versus to the resources of their associated scheduled AP) would according to some embodiments not even be present in the AP trigger frame to begin with. The above is true for a spatial reuse AP trigger frame which may not include STA resource allocation information, and especially for an OFDMA AP trigger frame is used, in which case, the AP resource allocations would have been split among time/frequency resources. In either case, the scheduled STAs would need to know, in the first instance, which resources correspond to the associated scheduled AP that is sending them the DL transmissions. In general, where an AP trigger frame is used, more information to the scheduled STAs may be needed to let the scheduled STAs know (1) which resource (such as subchannel resource) is allocated to the AP associated with that scheduled STA (the "associated AP"); and (2) which portion, such as which sub-band of a subchannel, of the resource from that associated AP are allocated to that specific scheduled STA. Without this information, each scheduled STA may not be able to determine where within the DL transmissions to look for to find data sent to it.

Embodiments contemplate two levels of resource allocation within a given BSS: one level of resource allocation for the scheduled AP, and the other level of resource allocation for the associated scheduled STAs. The first level may be communicated to the scheduled APs within the AP trigger frame. The second level may be communicated in the AP trigger frame, or it may be determined at each scheduled AP for its associated scheduled STAs, and communicated to the associated scheduled STAs by their scheduled AP. A STA that is referred to as an "associated STA" herein has a Physical Layer (PHY) ID for communication with one of the scheduled APs, where the ID may or may not be a temporary ID.

Example embodiments relate to a device, system and method for the coordination of simultaneous DL transmissions from respective ones of multiple APs to corresponding multiple STAs, where the simultaneous DL transmissions include information sent from the multiple APs to the multiple STAs regarding resource allocations of the DL transmissions. According to some demonstrative embodiments, following an AP trigger frame from the coordinator AP to a scheduled AP, the scheduled AP may transmit (and its baseband processing circuitry may encode for transmission) a wireless frame to one or more scheduled STAs associated with the scheduled AP ("associated scheduled STAs"), the wireless frame including information on a first resource allocation for the scheduled AP for DL transmissions by the scheduled AP to the associated scheduled STAs, and further including information on a second resource allocation (within the first resource allocation) for the associated scheduled STAs for the DL transmissions. A scheduled AP may forward information regarding its resource allocation from the coordinator AP to its associated scheduled STAs. Each scheduled AP may for example forward the AP trigger frame to its associated scheduled STAs.

Embodiments described herein may be relevant for the next generation of Wi-Fi amendments to IEEE 802.11 (NG Wi-Fi).

Example embodiments will now be described with reference to the accompanying figures, including FIGS. 5a through 8.

Figure 5A:
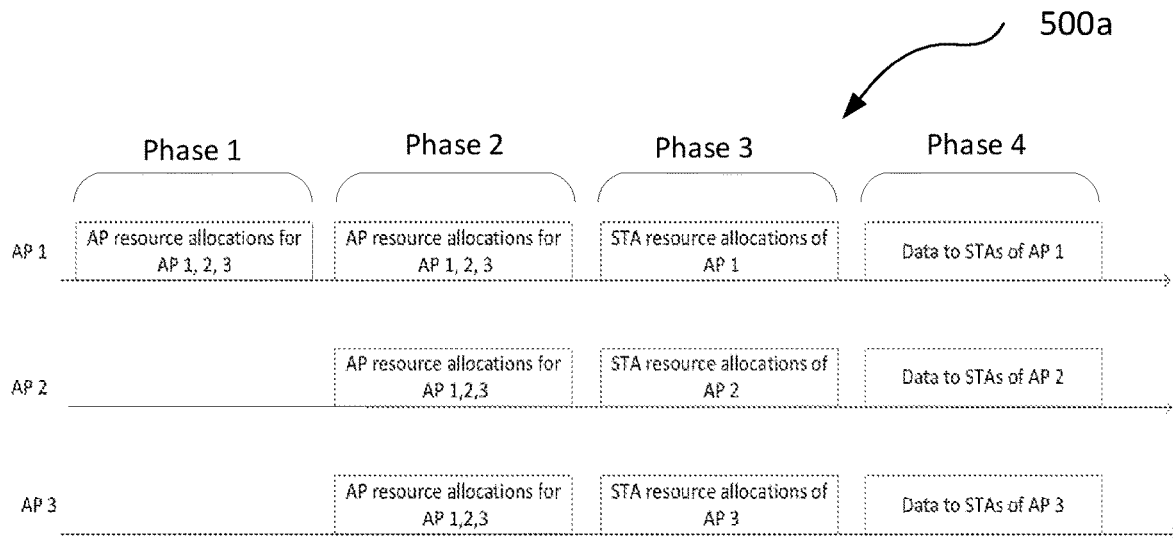
FIG. 5*a* is a schematic illustration of various phases for a transmission of resource allocation information to and from the APs of FIG. 2 according to one embodiment.
Figure 5B:
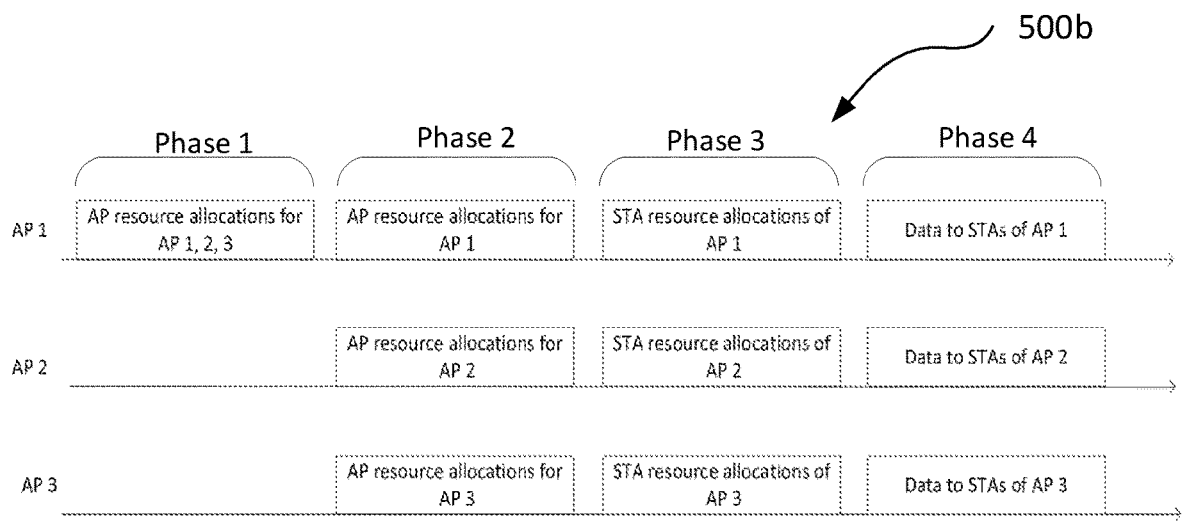
FIG. 5*b* is an illustration similar to that of FIG. 5*a*, according to a further embodiment.

FIGS. 5a and 5b depict, in a time domain and not necessarily to scale, a schematic illustration of various phases for the communication of resource allocation information and of simultaneous DL transmissions from multiple APs to multiple scheduled STAs. FIGS. 5a and 5b are schematic only, and are to be construed only to mean that embodiments contemplate a sequence of four phases for the communication of resource allocation and of simultaneous DL transmissions from multiple APs to respective associated scheduled STAs, and not necessarily to mean that such four phases necessarily mandate four distinct frames separated in time, or mandate four frames of the same duration, or mandate anything other than the sequence of four phases shown. As will be explained further in relation to FIGS. 6a-6c, some embodiments envisage combining various ones of the phases for the above communication into a single frame for a communication from a scheduled AP to its associated scheduled STAs.

Referring still to FIGS. 5a and 5b, Phase 1 includes the coordinator AP sending AP resource allocations, for example in the AP trigger frame, to schedule the concurrent/simultaneous DL AP transmissions from the scheduled APs. Phase 1 could be accomplished using any type of communication however, and is not limited to an AP trigger frame as described above. Where an AP trigger frame is used, Phase 1 could include either one broadcast (or multicast) trigger frame to the scheduled APs or multiple unicast trigger frames one to each of the scheduled APs e.g. using OFDMA. At Phase 2, each scheduled AP then may forward its AP resource allocation communicated to it by the coordinator AP to its associated scheduled STAs. A scheduled AP may not forward any information after Phase 2 if its CCA is busy. There are two variants to forwarding the AP resources in Phase 2, one variant being shown schematically in FIG. 5a, and the other shown schematically in FIG. 5b. The differences between these figures will be explained in further detail in subsequent paragraphs. Phase 3 will allow the associated scheduled STAs to know, when receiving simultaneous DL transmissions from multiple APs, where (to which AP resources) within the DL transmissions to look for the signals transmitted by their associated scheduled AP. At Phase 3, each scheduled AP may send STA resource allocations for its associated scheduled STAs to the associated scheduled STAs. This will allow each associated scheduled STA to know, when receiving simultaneous DL transmissions from multiple APs, and after having determined the AP resources within the DL transmissions allocated to its associated scheduled AP, where (to which STA resources) within those AP resources to look for the signals addressed to it and transmitted by its associated scheduled AP. At Phase 4, each AP then may transmit data to its associated scheduled STAs at the same time, that is, in simultaneous DL transmissions from the multiple APs, in one alternative including the coordinator AP along with the scheduled APs.

Figure 5C:
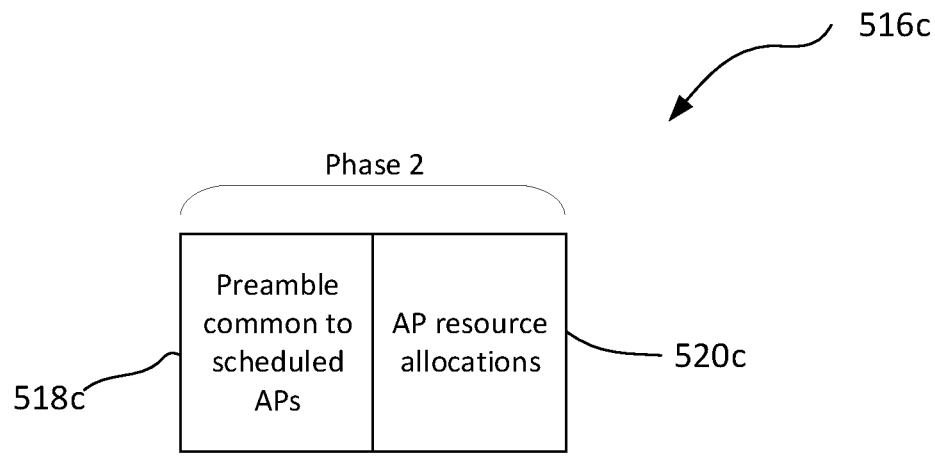
FIG. 5*c* is an illustration of a frame including information on AP and STA resource allocations according to an embodiment similar to the embodiment of FIG. 5*a*.

Referring next to FIG. 5a in conjunction with FIG. 5c, a first variant of Phase 2 involves each scheduled AP transmitting signals to all scheduled STAs in an identical communication, such as, for example, in an identical PPDU. For example, as depicted schematically in FIG. 5c, a Phase 2 communication 516c from each scheduled AP may be sent including a preamble portion 518c common to all scheduled APs (including a legacy preamble and an HE preamble), and a spatial-reuse AP-specific portion (or an AP resource allocation portion) 520c including information on the AP resource allocations for all APs on the same frequency for all scheduled APs. In one embodiment of identical PPDUs being sent in Phase 2, the scheduled APs may for example simply forward the coordinator AP trigger frame to their associated scheduled STAs. Sending an identical communication to all scheduled STAs to communicate AP resource allocations may be useful if the scheduled APs share the same primary subchannel, and where changes to 802.11ax are sought to be minimized. Since the STAs associated with an AP usually only listen to the primary subchannel of the AP for the legacy preamble L-SIG, and for the first part of a high efficiency (HE) preamble HE-SIG-A, a simultaneous transmission of the scheduled APs on the same subchannel would need to be the same to be consistent with information in the primary subchannel preamble. For example, the legacy preamble, including L-SIG, and the HE preamble may be the same, and may appear in a preamble portion similar to preamble portion 518c of FIG. 5c, and the payload forwarding the AP resource allocations as shown for Phase 2 of FIG. 5a and as depicted for example by AP-specific portion 520c of FIG. 5c may minimize changes required to 802.11ax.

Figure 5D:
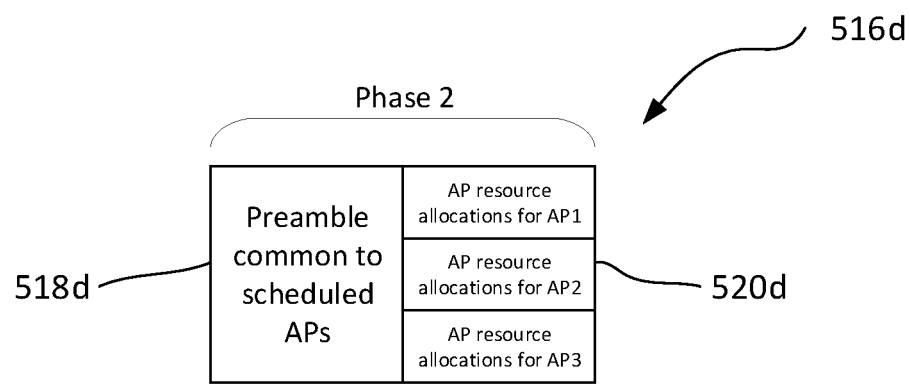
FIG. 5*d* is an illustration similar to that of FIG. 5*c* showing a frame including information on AP and STA resource allocations according to another embodiment similar to the embodiment of FIG. 5*b*.

Referring next to FIG. 5b in conjunction with FIG. 5d, a second variant of Phase 2 involves each scheduled AP transmitting signals to its associated scheduled STAs in separate communications sent on distinct OFDMA resources. For example, as depicted schematically in FIG. 5d, a Phase 2 communication 516d from each scheduled AP may be sent including a preamble portion 518d common to all scheduled APs (including a legacy preamble and an HE preamble), and an OFDMA AP-specific portion (or AP resource allocation portion) 520d. The AP resource allocation portion 520d may include a communication from each respective scheduled AP on a distinct corresponding resource, for example in a MIMO or OFDMA fashion. As suggested in FIG. 5d, for example, the communications of AP resource allocations in distinct resources may be effected from the scheduled APs in a simultaneous DL transmission to the scheduled STAs. In one embodiment of OFDMA communications being sent in Phase 2, the scheduled APs may for example simply forward the OFDMA AP trigger frame to their associated scheduled STAs. The preamble portion 518d of FIG. 5d may again include a legacy preamble, including L-SIG, and the HE preamble. The payload forwarding the AP resource allocations as shown for Phase 2 of FIG. 5b and as depicted for example by AP resource allocation portion 520d of FIG. 5d may require changes to 802.11ax. However, the variant in FIGS. 5b and 5d may be more efficient.

According to some embodiments, Phases 3 and 4 (sending STA resources allocations along with sending data to the STAs) may be combined in one PPDU. Here, Phase 3 may represent the preamble and Phase 4 may represent the data portion of the PPDU. According to one embodiment, for higher efficiency, Phases 2, 3 and 4 may be combined into one PPDU (essentially, all communications up to and including the data portion from the scheduled APs to their associated scheduled STAs may be combined into one PPDU). The above may be effected however possibly at the cost of Physical Layer (PHY) changes to 802.11ax.

Figure 6A:
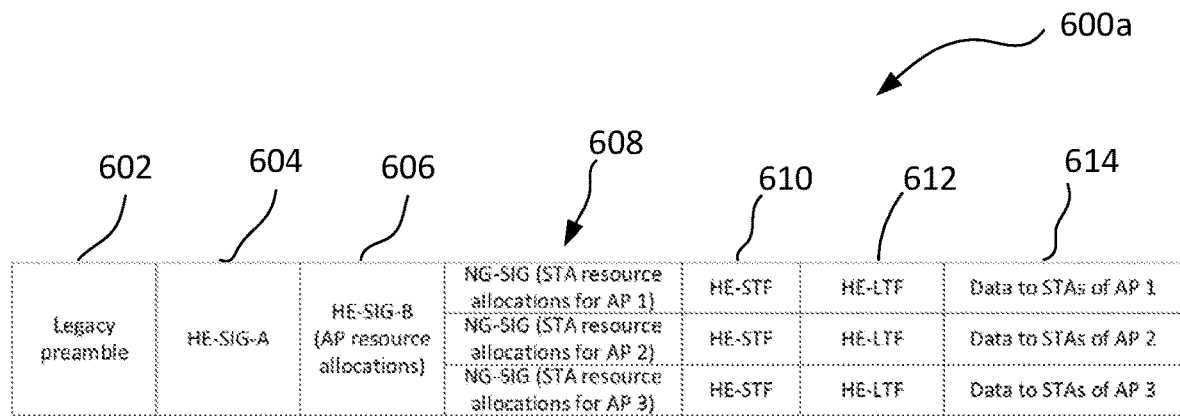
FIG. 6*a* illustrates a frame including simultaneous downlink (DL) transmissions containing information on AP and STA resource allocations according to one embodiment.
Figure 6B:
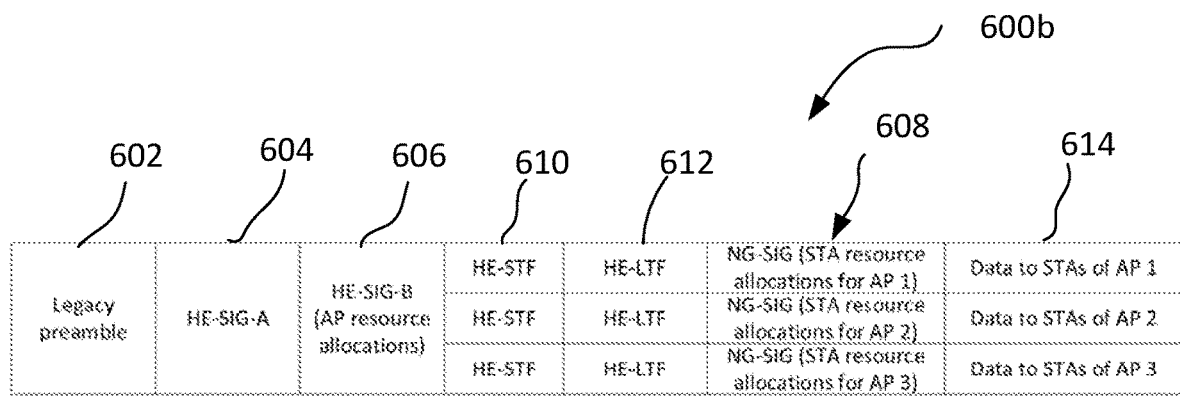
FIG. 6*b* illustrates a frame including simultaneous downlink (DL) transmissions containing information on AP and STA resource allocations according to another embodiment.
Figure 6C:
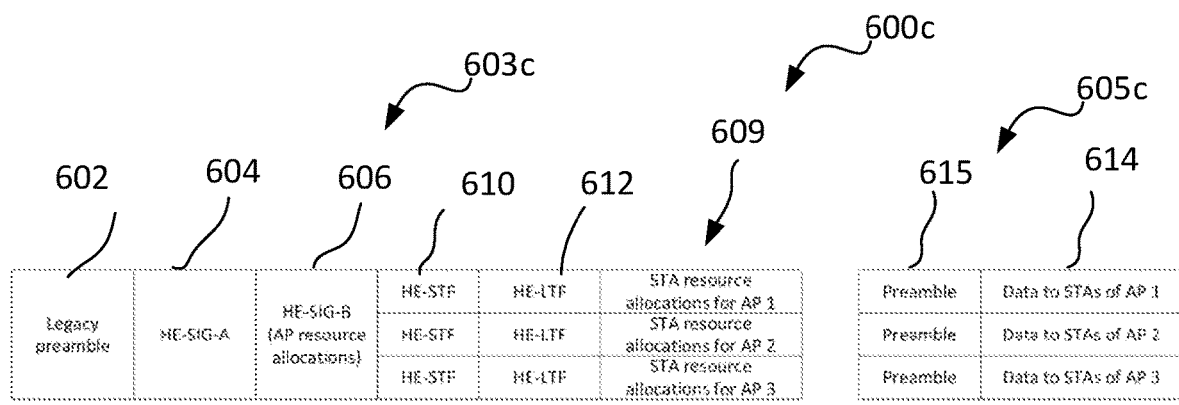
FIG. 6*c* illustrates a frame including simultaneous downlink (DL) transmissions containing information on AP and STA resource allocations according to an alternative embodiment.

Reference will now be made to FIGS. 6a-6c with reference to combining Phases 2 through 4 as described in the paragraph above. FIGS. 6a-6c correspond to three alternative embodiments for the variant of FIGS. 5a and 5c, where the resource allocations for all scheduled APs are sent on the same resource, followed by STA allocations sent on a per AP basis in a simultaneous DL communication including components from each scheduled AP.

FIGS. 6a, 6b and 6c show respective variants of an OFDMA PPDU structure (combining spatial-reuse and OFDMA portions) to combine Phases 2 through 4 for a communication from each scheduled AP to its associated scheduled STAs. While FIGS. 6a and 6b show a "PHY" option (likely requiring PHY changes to 802.11ax), FIG. 6c shows a Medium Access Control (MAC) option which allows reusing a signal format of 802.11ax for the DL data transmission (Phase 4). Each of the PPDU formats 600a, 600b and 600c respectively of FIGS. 6a, 6b and 6c, includes a legacy preamble portion 602, a HE preamble including a HE-SIG-A field 604 and a HE-SIG-B field 606, along with an HE Short Training field (HE-STF) 610, and an HE Long Training field (HE-LTF) 612 and a data portion or data field 614 to the respective STAs of APs 1 through 3. APs 1-3 here may be similar for example to APs 1-3 of FIG. 2. The legacy preamble portion and HE preamble portions such as HE-SIG-A and HE-SIG-B may be part of a common preamble portion common to the plurality of APs.

Referring still to FIGS. 6a-6c, each PPDU format 600a, 600b further includes a Next Generation (NG) SIG field (NG-SIG) 608, and, in addition, PPDU format 600c further includes a STA resource allocations field 609. Fields 608/609 (which correspond to STA resource allocation portions of the PPDUs shown) include information on STA resource allocations to the scheduled STAs on a per AP basis. Although FIGS. 6a, 6b and 6c show specific respective orders for each of the fields noted above, embodiments are not so limited, nor are embodiments limited to the specific fields shown for FIGS. 6a, 6b and 6c where the variant of FIGS. 5a and 5c are contemplated. Referring still to FIGS. 6a, 6b and 6c, the preamble portion, including the legacy preamble portion 602, HE-SIG-A field 604, and HE-SIG-B field 606 is common to all APs, and appears on the same resources (frequency time and space resources) transmitted by each scheduled AP using the same PHY format. In the PPDU of each of FIGS. 6a-6c, the HE-SIG-B field 606 may be reused (with respect to the HE-SIG-B field currently in 802.11ax) to include information regarding the AP resource allocations. However, the HE-STF 610, the HE-LTF 612, the NG-SIG 608 (for FIGS. 6a and 6b) and STA resource allocation field 609 (for FIG. 6c) and the data portions 614 all represent communications from respective scheduled APs on distinct resources using OFDMA. The HE-STF and the HE-LTF may be therefore different for each of the scheduled APs to their associated scheduled STAs. By way of example, AP1 would be sending to its associated scheduled STAs: the legacy preamble portion 602, HE-SIG-A 604, and HE-SIG-B 606, plus the NG-SIG 608 for STA resource allocations for AP1, plus the HE-STF, HE-LTF at the top resource band of FIG. 6a, plus the data portion 614 to STAs of AP1. AP2 would similarly send the preamble portion followed by its own communications to its associated scheduled STAs, and AP3 would do the same, resulting in the PPDU 600a of FIG. 6a, which represents a simultaneous DL communication from AP1-AP3 (and a comparable description may be given equally as well with respect to FIGS. 6b and 6c).

Referring now specifically to FIG. 6a, since the NG-SIGs 608 appear before the HE-STFs 610 and HE-LTFs 612, channel estimation for the NG-SIGs 608 relies on the legacy preamble portions 602, and HE preambles 604 and 606 only. In the embodiment of FIG. 6a, the NG-SIGs 608 may be broadcast or multicast, because they occur prior to the HE-LTF and HE-STF. The scheduled APs would have to send the NG-SIGs simultaneously in this way to keep their communications in line with the channel estimation from the preamble portions 602, 604 and 606. The above may be doable where the STA resource allocations of each scheduled AP are known by all scheduled APs. Because, in this embodiment, each associated scheduled STA knows its resources prior to the HE-STFs and HE-LTFs, the training in the HE-STF and HE-LTF may more efficiently correspond only to the associated scheduled STA's allocated resources.

Referring now to FIG. 6b, an improved PPDU structure as compared with FIG. 6a places the NG-SIGs 608 after the HE-STF and HE-LTF 610 and 612, respectively. In the embodiment of FIG. 6b, since the NG-SIGs 608 come after the HE-STF and HE-LTFs, they may be beamformed to groups of the associated scheduled STAs, leading to a better use of resources and a maximization in the reuse of the HE preamble. However, in this embodiment, each STA must go through training by virtue of HE-STF and HE-LTF before it knows its resource allocation, and, as a result, must get trained on all spatial streams prior to being able to decode the NG-SIGs (which is not as efficient as the embodiment of FIG. 6a but would result in a better use of resources). For FIG. 6b, the number of spatial streams may either be the same as the number of spatial streams for the data portion for each AP, or, in the alternative, the NG-SIG may be carried by a first spatial stream of a number of spatial streams used in the data portion.

Referring now to FIG. 6c, in order to maximize backward compatibility, STA resource allocations may be sent in a first frame from each scheduled AP to its corresponding STAs in a first frame 603c, and may be followed thereafter by a later frame including a preamble 615 and the data portion 614 as shown. Here, the STAs receive the STA resource allocations in a frame separate from the data frame, and will decode in the data frame its subchannel or resource that was specified in the prior STA resource allocation frame. It is noted here that the STA resource allocation fields 609 are not termed "NG-SIG" fields as they were for FIGS. 6a and 6b, to the extent that sending STA resource allocations in the manner depicted in FIG. 6c would not necessitate PHY changes to 802.11ax, and could therefore be viewed as not necessarily amounting to a NG PHY structure.

While FIGS. 6a and 6b show PPDUs from the scheduled APs to their scheduled STAs that amount to what we will call a "PHY approach" to communicating AP and STA resource allocations to the STAs, FIG. 6c shows a PPDU from the scheduled APs to their scheduled STAs that amounts to what we will call a "MAC approach" to achieving the same objective. The PHY approach aims to maximize efficiency by putting the AP resource allocation, the STA resource allocation and the data in one frame, which would require a new preamble format in PHY. The MAC approach would build on the currently developing 802.11ax protocol and exhibit backward compatibility, and, at least because of this reason, may represent a preferred embodiment. The PHY approach of FIG. 6b may present a next preferred embodiment by virtue of its advantageously maximizing resource use.

According to the PHY approach, the coordinator AP, such as AP1 of FIG. 2, may first allocate resources to different APs. The allocation may be carried by an AP trigger frame. Each scheduled AP may then send to its associated scheduled STAs STA resource allocation information using the resource (e.g. subchannel or RU) allocated to the scheduled AP by the coordinator AP. Each scheduled AP may then send downlink data using the resource allocated as described above. For each scheduled STA to find its resource, the preamble of the data communication includes two portions, an AP common portion and an AP-specific portion. The AP common portion may carry AP resource allocation information, and may be sent by all scheduled APs in the same format simultaneously in DL over all the primary subchannels that the scheduled STAs listen to. The second portion, the AP-specific portion, may carry the STA resource allocation information for each scheduled AP. In the PHY approach, each scheduled STA would first decode the AP common portion to find its AP resource allocation, and would then decode the AP-specific portion on the resource allocated to its associated scheduled AP in order to obtain STA resource allocation information and/or its data.

According to the MAC approach, the coordinator AP, such as AP1 in FIG. 2, may first allocate resources to different APs. The allocation may be carried by an AP trigger frame. Each scheduled AP may then send to its associated scheduled STAs STA resource allocation information using the resource (e.g. subchannel or RU) allocated to the scheduled AP by the coordinator AP. Each scheduled AP may thereafter send downlink data using the resource allocated as described above. Using a frame separate from the wireless frame containing DL data to the scheduled STAs, each scheduled AP may communicate to its scheduled STAs regarding its AP resource allocation. A simple implementation of the latter, according to one embodiment, would be for each scheduled AP to forward the AP trigger frame to its associated scheduled STAs (i.e. the scheduled APs may send a forwarded version of the AP trigger frame to their associated scheduled STAs). Namely, the APs may merely relay AP resource allocation information simultaneously in the same PHY format similar to an 802.11ax MU-CTS. After communication of AP resource information to scheduled STAs, scheduled APs may then send a simultaneous DL data transmission using the resources allocated to their respective scheduled STAs, for example using a signal format similar to that used for 802.11ax MU PPDUs.

Figure 7:
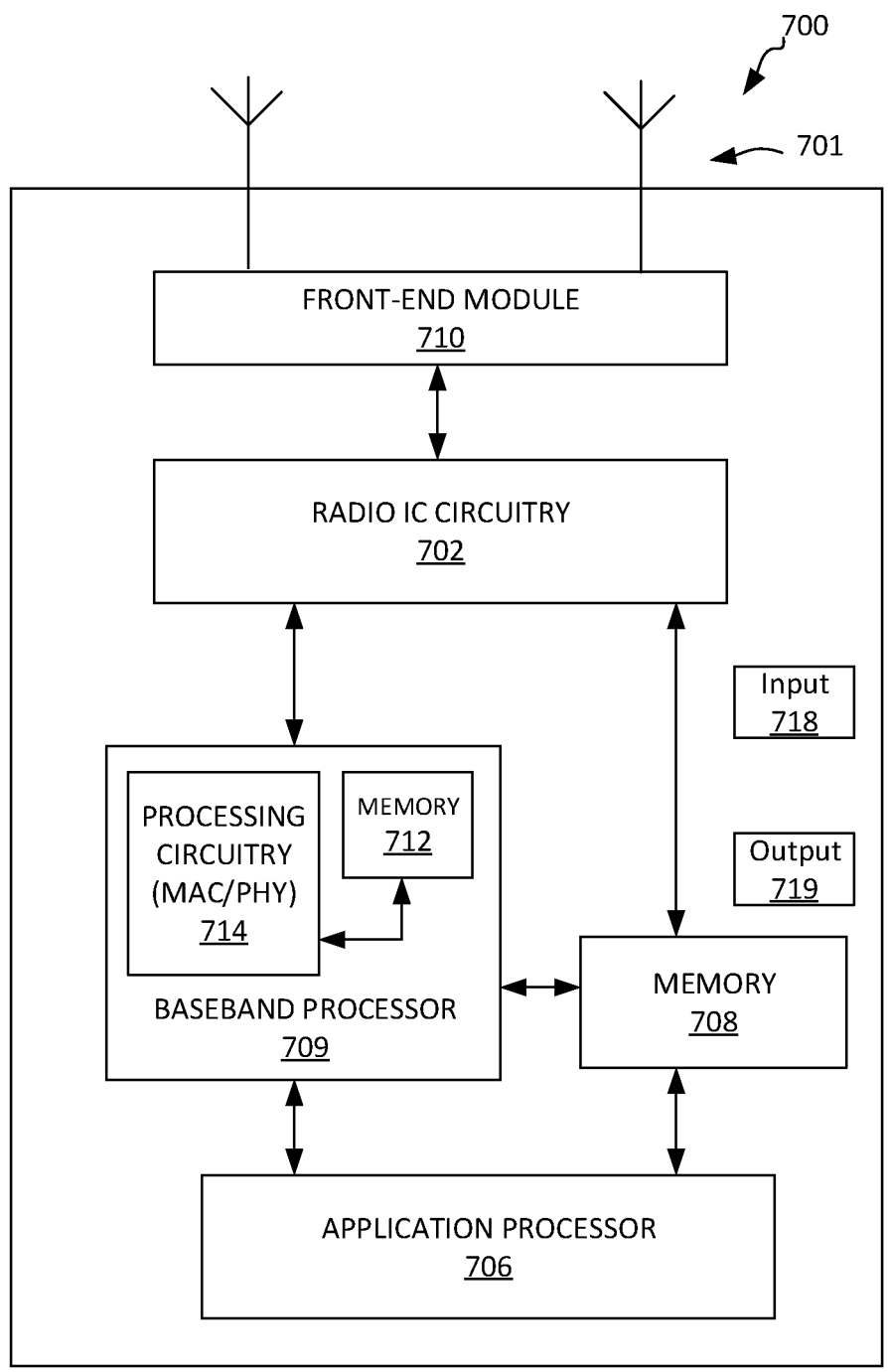
FIG. 7 illustrates a radio architecture of a STA or an AP from the network of FIG. 1 or FIG. 2 in accordance with some demonstrative embodiments.

Referring next to FIG. 7, a block diagram is shown of a wireless communication system such as STA 700 or AP 700 (hereinafter STA/AP 700) such as any of STA1-STA7 of FIG. 2, or such as any of AP1-AP3 of FIG. 2, according to some demonstrative embodiments. FIG. 7 shows an example of a STA or of an AP that may implement any of the mechanisms described above in relation to FIGS. 5a through 6c.

When referring to FIG. 7, it is noted that the figure depicts one embodiment of a STA, or one embodiment of an AP, as would be recognized by a skilled person, although embodiments are not so limited. At certain points within the below description, therefore, FIG. 7 will be referred to as an apparatus including an architecture for a STA 700, while at certain other points within the below description, FIG. 7 will be referred to as an apparatus including an architecture for an AP 700. The context will, however, be clear based on the description being provided.

As shown in FIG. 7, a wireless communication system may include a wireless communication radio architecture in accordance with some demonstrative embodiments. The shown radio architecture may include radio front-end module (FEM) circuitry 710, radio IC circuitry 702 and baseband processor 709. In FIG. 7, it is to be noted that the representation of a single antenna may be interpreted to mean one or more antennas. Although FIG. 7 shows a single radio IC circuitry block 702, a single FEM circuitry block 710 and a single baseband circuitry block 709, these blocks are to be viewed as representing the possibility of one or more circuitry blocks, where potentially one set of distinct circuitry blocks, for example, a distinct FEM circuitry, and/or a distinct radio IC circuitry, would work to provide the relevant functionalities noted herein. As used herein, "processing circuitry" or "processor" is used interchangeably herein, and may include one or more distinctly identifiable processor blocks. As used herein, "processing" may entail processing fully or processing partially.

FEM circuitry 710 may include a receive signal path comprising circuitry configured to operate on Wi-Fi signals received from one or more antennas 701, to amplify the received signals and to provide the amplified versions of the received signals to the radio IC circuitry 702 for further processing. FEM circuitry 710 may also include a transmit signal path which may include circuitry configured to amplify signals provided by the radio IC circuitry 702 for wireless transmission by one or more of the antennas 701. The antennas may include directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Radio IC circuitry 702 as shown may include a receive signal path which may include circuitry to down-convert signals received from the FEM circuitry 710 and provide baseband signals to baseband processor 709. The radio IC circuitry 702 may also include a transmit signal path which may include circuitry to up-convert baseband signals provided by the baseband processor 709 and provide RF output signals to the FEM circuitry 710 for subsequent wireless transmission by the one or more antennas 701. In addition, embodiments include within their scope the provision of a radio IC circuitry that allows transmission of LP-WU signals.

Baseband processor 709 may include processing circuitry that provides Wi-Fi functionality. In the instant description, the baseband processor 709 may include a memory 712, such as, for example, a set of RAM arrays or RAM banks in a Fast Fourier Transform or Inverse Fast Fourier Transform block (not shown) of the baseband processor 709. Memory 712 may further store control logic. Processing circuitry 714 may implement control logic within the memory to process the signals received from the receive signal path of the radio IC circuitry 702. Baseband processor 709 is also configured to also generate corresponding baseband signals for the transmit signal path of the radio IC circuitry 702, and may further include physical layer (PHY) and medium access control layer (MAC) circuitry, and may further interface with application processor 706 for generation and processing of the baseband signals and for controlling operations of the radio IC circuitry 702.

In some demonstrative embodiments, the front-end module circuitry 710, the radio IC circuitry 702, and baseband processor 709 may be provided on a single radio card. In some other embodiments, the one or more antennas 701, the FEM circuitry 710 and the radio IC circuitry 702 may be provided on a single radio card. In some other embodiments, the radio IC circuitry 702 and the baseband processor 709 may be provided on a single chip or integrated circuit (IC).

In some demonstrative embodiments, a wireless radio card may include a Wi-Fi radio card and may be configured for Wi-Fi communications, although the scope of the embodiments is not limited in this respect. In some of these embodiments, the radio architecture may be configured to receive and transmit OFDM or OFDMA communication signals over a multicarrier communication channel.

In some other embodiments, the radio architecture of system or device (STA/AP) 700 may be configured to transmit and receive signals transmitted using one or more modulation techniques other than OFDM or OFDMA, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some demonstrative embodiments, the radio-architecture of system 700 may include other radio cards, such as a WiGig radio card, or a cellular radio card configured for cellular (e.g., 3GPP such as LTE, LTE-Advanced or 5G communications).

In some IEEE 802.11 embodiments, the radio architecture of system 700 may be configured for communication over various channel bandwidths including bandwidths having center frequencies of 900 MHz, 2.4 GHz, 5 GHz, and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some demonstrative embodiments, a 320 MHz channel bandwidth may be used. In a further embodiment, the radio architecture of system 700 may be configured to operate on center frequencies above 45 GHz. The scope of the embodiments is not limited with respect to the above frequencies however.

Referring still to FIG. 7, in some demonstrative embodiments, STA/AP 700 may further include an input unit 718, an output unit 719, a memory unit 708. STA/AP 700 may optionally include other suitable hardware components and/or software components. In some demonstrative embodiments, some or all of the components of STA/AP 700 may be enclosed in a common housing or packaging, and may be interconnected or operably associated using one or more wired or wireless links. In other embodiments, components of STA/AP 700 may be distributed among multiple or separate devices.

In some demonstrative embodiments, application processor 706 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Application processor 706 may execute instructions, for example, of an Operating System (OS) of STA/AP 700 and/or of one or more suitable applications.

In some demonstrative embodiments, input unit 718 may include, for example, one or more input pins on a circuit board, a keyboard, a keypad, a mouse, a touch-screen, a touch-pad, a track-ball, a stylus, a microphone, or other suitable pointing device or input device. Output unit 719 may include, for example, one or more output pins on a circuit board, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 708 may include, for example, a Random-Access Memory (RAM), a Read-Only Memory (ROM), a Dynamic RAM (DRAM), a Synchronous DRAM (SD-RAM), a flash memory, a volatile memory, a non-volatile memory, a cache memory, a buffer, a short-term memory unit, a long-term memory unit, or other suitable memory units. Storage unit 717 may include, for example, a hard disk drive, a floppy disk drive, a Compact Disk (CD) drive, a CD-ROM drive, a DVD drive, or other suitable removable or non-removable storage units. Memory unit 708 and/or storage unit 717, for example, may store data processed by STA/AP 700.

According to some demonstrative embodiments, a wireless communication device, such as a baseband processor 709 within the AP 700 of FIG. 7, by way of example, may comprise a memory, such as memory 712 of FIG. 7 by way of example, and processing circuitry coupled to the memory, such as processing circuitry 714 by way of example, the memory storing instructions. The processing circuitry is to execute the instructions to decode an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs). The plurality of APs include the coordinator AP and an AP corresponding to the wireless communication device (corresponding AP). The processing circuitry is further to cause transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP. The processing circuitry is to encode data for transmission to the associated scheduled STAs based on the corresponding AP resource allocation and on the associated STA resource allocations; and to cause transmission of the data. The device may include a radio integrated circuit coupled to the baseband processor, a front-end module coupled to the radio integrated circuit, and a plurality of antennas, the device to further transmit the data by way of the antennas.

According to some demonstrative embodiments, a wireless communication device, such as a baseband processor 709 within the STA 700 of FIG. 7, by way of example, may comprise a memory, such as memory 712 of FIG. 7 by way of example, and processing circuitry coupled to the memory, such as processing circuitry 714 by way of example, the memory storing instructions. The processing circuitry is to decode a wireless frame addressed to a plurality of STAs, respective groups of the STAs being associated with respective ones of a plurality of access points (APs). The wireless frame includes simultaneous downlink (DL) transmissions from the plurality of APs to the plurality of STAs, the wireless frame further including information on resource allocations by a coordinator AP to respective ones of the plurality of APs (AP resource allocations) for simultaneous DL transmissions, and information on respective resource allocations for data transmissions from each of the plurality of APs to respective ones of the groups of STAs (STA resource allocations). Decoding the wireless frame includes determining an AP resource allocation of an AP associated with a STA that corresponds to the device (i.e. determining which one of the AP resource allocations is for the AP associated with the STA that corresponds to the wireless device). Decoding the wireless frame further includes, within the AP resource allocation mentioned immediately above, decoding a STA resource allocation for the STA that corresponds to the device. The processing circuitry is further to decode data in the data transmissions based on the AP resource allocation and on the associated STA resource allocation, and further, in response to decoding the data, cause transmission of an uplink (UL) acknowledgment frame to the AP associated with the STA that corresponds to the device.

Figure 8:
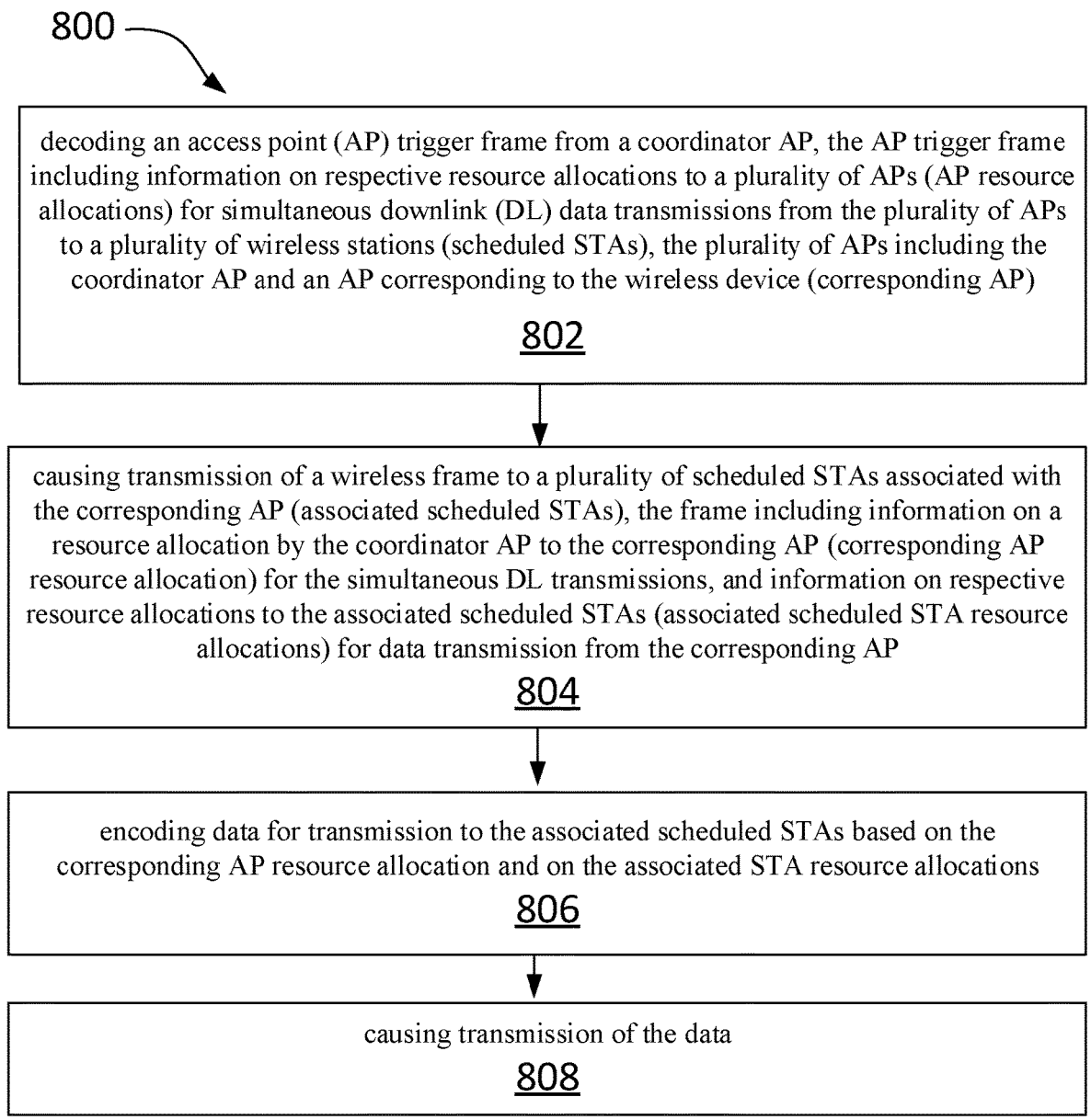
FIG. 8 illustrates a flow-chart of a method according to one demonstrative embodiment.

FIG. 8 illustrates a method 800 in accordance with some demonstrative embodiments. The method 800 may begin with operation 802, which includes decoding an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP). At operation 804, the method includes causing transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP. At operation 806, the method includes encoding data for transmission to the associated scheduled STAs based on the corresponding AP resource allocation and on the associated STA resource allocations. At operation 808, the method includes causing transmission of the data.

FIG. 9 illustrates another method 900 in accordance with some demonstrative embodiments. The method 900 may begin with operation 902, which includes decoding a wireless frame addressed to a plurality of STAs, respective groups of the STAs being associated with respective ones of a plurality of access points (APs), the wireless frame including simultaneous downlink (DL) transmissions from the plurality of APs to the plurality of STAs, the wireless frame further including information on resource allocations by a coordinator AP to respective ones of the plurality of APs (AP resource allocations) for simultaneous DL transmissions, and information on respective resource allocations for data transmissions from each of the plurality of APs to respective ones of the groups of STAs (STA resource allocations). Decoding the wireless frame includes: determining an AP resource allocation of an AP associated with a STA that corresponds to the device; and, within the AP resource allocation, decoding a STA resource allocation for the STA that corresponds to the device. At operation 904, the method further includes decoding data in the data transmissions based on the AP resource allocation and on the associated STA resource allocation. At operation 906 the method includes causing transmission of an uplink (UL) acknowledgment frame to the AP associated with the STA that corresponds to the device.

Figure 10:
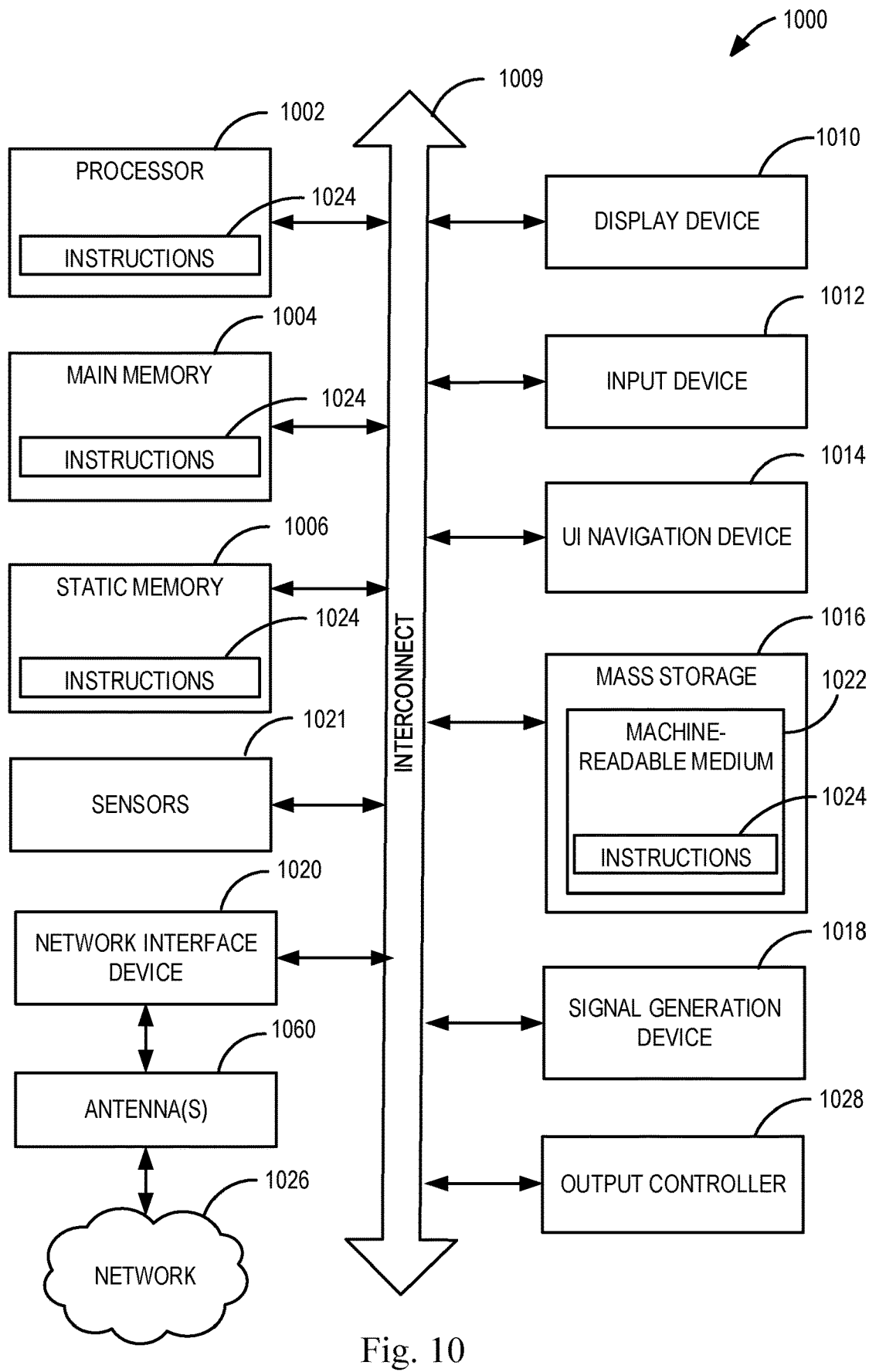
FIG. 10 illustrates a product of manufacture in accordance with some demonstrative embodiments.

FIG. 10 illustrates a block diagram of an example of a machine 1000 or system upon which any one or more of the techniques (e.g., methodologies) discussed herein may be performed. In other embodiments, the machine 1000 may operate as a standalone device or may be connected (e.g., networked) to other machines for example by way of network 1026. In a networked deployment, the machine 1000 may operate in the capacity of a server machine, a client machine, or both in server-client network environments. In an example, the machine 1000 may act as a peer machine in peer-to-peer (P2P) (or other distributed) network environments. The machine 1000 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable storage medium or medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a graphics display device 1010, an alphanumeric input device 1012 (e.g., a keyboard), and a user interface (UI) navigation device 1014 (e.g., a mouse). In an example, the graphics display device 1010, alphanumeric input device 1012, and UI navigation device 1014 may be a touch screen display. The machine 1000 may additionally include a storage device (i.e., drive unit) 1016, a signal generation device 1018 (e.g., a speaker), a OFDMA uplink resource allocation device 1019, a network interface device/transceiver 1020 coupled to antenna(s) 1030, and one or more sensors 1028, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

Some demonstrative embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. Those instructions may then be read and executed by one or more processors to cause the device 700 of FIG. 7 to perform the methods and/or operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

EXAMPLES

The following examples pertain to further embodiments.

Example 1 includes a wireless communication device comprising a memory storing logic, and processing circuitry coupled to the memory, the processing circuitry to execute the logic to: decode an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP); cause transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP; encode data for transmission to the associated scheduled STAs based on the corresponding AP resource allocation and on the associated STA resource allocations; and cause transmission of the data.

Example 2 includes the subject matter of Example 1, and optionally, wherein the wireless frame includes the data.

Example 3 includes the subject matter of Example 1, and optionally, wherein the wireless frame includes a forwarded version of the AP trigger frame.

Example 4 includes the subject matter of Example 1, and optionally, wherein the wireless frame includes: a common preamble portion common to the plurality of APs, the common preamble portion including a legacy preamble portion and a high efficiency (HE) preamble portion; and an AP resource allocation portion, the AP resource allocation portion including, on a same frequency band, information on AP resource allocations for the plurality of APs.

Example 5 includes the subject matter of Example 1, and optionally, wherein the wireless frame includes: a common preamble portion common to the plurality of APs, the common preamble portion including a legacy preamble portion and a high efficiency (HE) preamble portion; and an AP resource allocation portion including information on the corresponding AP resource allocation, the AP resource allocation portion to use a frequency band relating to the corresponding AP resource allocation.

Example 6 includes the subject matter of Example 1, and optionally, wherein the wireless frame includes: common preamble portion common to the plurality of APs, the common preamble portion including a legacy preamble portion and a high efficiency (HE) preamble portion; and a STA resource allocation portion including information on associated scheduled STA resource allocations, the STA resource allocation portion to use respective frequency bands for respective ones of the associated scheduled STA resource allocations.

Example 7 includes the subject matter of Example 6, and optionally, wherein the HE preamble portion includes a HE signal (SIG) B field (HE-SIG-B), the HE-SIG-B including information on the AP resource allocations.

Example 8 includes the subject matter of Example 7, and optionally, wherein the common preamble portion further includes a HE Short Training Field (HE-STF), a HE Long Training field (HE-LTF).

Example 9 includes the subject matter of Example 8, and optionally, wherein: the STA resource allocation portion includes a Next Generation (NG) signal (SIG) field (NG-SIG), the NG-SIG to be part of the common preamble portion, to be after the HE-SIG-B in a time domain, and further to be one of before or after the HE-STF and the HE-LTF in the time domain; and a payload portion following the common preamble portion, the payload portion including the data.

Example 10 includes the subject matter of Example 1, and optionally, wherein the wireless frame includes: a common preamble portion common to the plurality of APs, the preamble portion including a legacy preamble portion and a high efficiency (HE) preamble portion, the HE preamble portion including: a HE signal (SIG) B field (HE-SIG-B) including information on the AP resource allocations; a HE Short Training Field (HE-STF); and a HE Long Training field (HE-LTF); and a payload portion following the common preamble portion, the payload portion including a STA resource allocation portion that includes information on associated scheduled STA resource allocations, the information on associated scheduled STA resource allocations being on respective frequency bands of the payload portion for respective ones of the associated scheduled STAs.

Example 11 includes the subject matter of Example 1, and optionally, wherein the AP trigger frame further includes information on a duration of DL data frames to be transmitted simultaneously by the plurality of APs as part of the simultaneous DL transmissions.

Example 12 includes the subject matter of Example 11, and optionally, wherein the AP trigger frame further includes information on a duration of acknowledgment frames to be sent by the scheduled STAs to the plurality of APs.

Example 13 includes the subject matter of Example 11, and optionally, wherein the AP trigger frame includes: a common portion common to the plurality of APs, the common portion including a preamble; and an orthogonal frequency division multiple access (OFDMA) AP-specific portion, the OFDMA AP-specific portion including information on AP resource allocations for respective ones of the plurality of APs on respective ones of the AP resource allocations.

Example 14 includes the subject matter of Example 11, and optionally, wherein the AP trigger frame includes: a common portion common to the plurality of APs, the common portion including a preamble; and a spatial-reuse AP-specific portion in the common portion, the spatial-reuse AP-specific portion including information on AP resource allocations for respective ones of the plurality of APs.

Example 15 includes the subject matter of Example 1, and optionally, wherein the wireless frame is an orthogonal frequency division multiple access (OFDMA) frame.

Example 16 includes the subject matter of any one of Examples 1-15, and optionally, further including a radio integrated circuit coupled to the processing circuitry, and a front-end module coupled to the radio integrated circuit.

Example 17 includes the subject matter of Example 16, and optionally, further including a plurality of antennas coupled to the front-end module.

Example 18 includes a product comprising one or more tangible computer-readable non-transitory storage media comprising computer-executable instructions operable to, when executed by at least one computer processor, enable the at least one computer processor to implement operations at a wireless communication device, the operations comprising: decoding an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP); causing transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP; encoding data for transmission to the associated scheduled STAs based on the corresponding AP resource allocation and on the associated STA resource allocations; and causing transmission of the data.

Example 19 includes the subject matter of Example 18, and optionally, wherein the wireless frame includes the data.

Example 20 includes the subject matter of Example 18, and optionally, wherein the wireless frame includes a forwarded version of the AP trigger frame.

Example 21 includes the subject matter of Example 18, and optionally, wherein the wireless frame includes: a common preamble portion common to the plurality of APs, the common preamble portion including a legacy preamble portion and a high efficiency (HE) preamble portion; and an AP resource allocation portion, the AP resource allocation portion including, on a same frequency band, information on AP resource allocations for the plurality of APs.

Example 22 includes the subject matter of Example 18, and optionally, wherein the wireless frame includes: a common preamble portion common to the plurality of APs, the common preamble portion including a legacy preamble portion and a high efficiency (HE) preamble portion; and an AP resource allocation portion including information on the corresponding AP resource allocation, the AP resource allocation portion to use a frequency band relating to the corresponding AP resource allocation.

Example 23 includes the subject matter of Example 18, and optionally, wherein the wireless frame includes: a common preamble portion common to the plurality of APs, the common preamble portion including a legacy preamble portion and a high efficiency (HE) preamble portion; and a STA resource allocation portion including information on associated scheduled STA resource allocations, the STA resource allocation portion to use respective frequency bands for respective ones of the associated scheduled STA resource allocations.

Example 24 includes the subject matter of Example 23, and optionally, wherein the HE preamble portion includes a HE signal (SIG) B field (HE-SIG-B), the HE-SIG-B including information on the AP resource allocations.

Example 25 includes the subject matter of Example 24, and optionally, wherein the common preamble portion further includes a HE Short Training Field (HE-STF), a HE Long Training field (HE-LTF).

Example 26 includes the subject matter of Example 25, and optionally, wherein: the STA resource allocation portion includes a Next Generation (NG) signal (SIG) field (NG-SIG), the NG-SIG to be part of the common preamble portion, to be after the HE-SIG-B in a time domain, and further to be one of before or after the HE-STF and the HE-LTF in the time domain; and a payload portion following the common preamble portion, the payload portion including the data.

Example 27 includes the subject matter of Example 18, and optionally, wherein the wireless frame includes: a common preamble portion common to the plurality of APs, the preamble portion including a legacy preamble portion and a high efficiency (HE) preamble portion, the HE preamble portion including: a HE signal (SIG) B field (HE-SIG-B) including information on the AP resource allocations; a HE Short Training Field (HE-STF); and a HE Long Training field (HE-LTF); and a payload portion following the common preamble portion, the payload portion including a STA resource allocation portion that includes information on associated scheduled STA resource allocations.

Example 28 includes the subject matter of Example 18, and optionally, wherein the AP trigger frame further includes information on a duration of DL data frames to be transmitted simultaneously by the plurality of APs as part of the simultaneous DL transmissions.

Example 29 includes the subject matter of Example 28, and optionally, wherein the AP trigger frame further includes information on a duration of acknowledgment frames to be sent by the scheduled STAs to the plurality of APs.

Example 30 includes the subject matter of Example 28, and optionally, wherein the AP trigger frame includes: a common portion common to the plurality of APs, the common portion including a preamble; and an orthogonal frequency division multiple access (OFDMA) AP-specific portion, the OFDMA AP-specific portion including information on AP resource allocations for respective ones of the plurality of APs on respective ones of the AP resource allocations.

Example 31 includes the subject matter of Example 28, and optionally, wherein the AP trigger frame includes: a common portion common to the plurality of APs, the common portion including a preamble; and a spatial-reuse AP-specific portion in the common portion, the spatial-reuse AP-specific portion including information on AP resource allocations for respective ones of the plurality of APs.

Example 32 includes the subject matter of Example 18, and optionally, wherein the wireless frame is an orthogonal frequency division multiple access (OFDMA) frame.

Example 33 includes a method of operating a wireless communication device, the method comprising: decoding an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP); causing transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP; encoding data for transmission to the associated scheduled STAs based on the corresponding AP resource allocation and on the associated STA resource allocations; and causing transmission of the data.

Example 34 includes the subject matter of Example 33, and optionally, wherein the wireless frame includes the data.

Example 35 includes the subject matter of Example 33, and optionally, wherein the wireless frame includes a forwarded version of the AP trigger frame.

Example 36 includes the subject matter of Example 33, and optionally, wherein the wireless frame includes: a common preamble portion common to the plurality of APs, the common preamble portion including a legacy preamble portion and a high efficiency (HE) preamble portion; and an AP resource allocation portion, the AP resource allocation portion including, on a same frequency band, information on AP resource allocations for the plurality of APs.

Example 37 includes the subject matter of Example 33, and optionally, wherein the wireless frame includes: a common preamble portion common to the plurality of APs, the common preamble portion including a legacy preamble portion and a high efficiency (HE) preamble portion; and an AP resource allocation portion including information on the corresponding AP resource allocation, the AP resource allocation portion to use a frequency band relating to the corresponding AP resource allocation.

Example 38 includes the subject matter of Example 33, and optionally, wherein the wireless frame includes: a common preamble portion common to the plurality of APs, the common preamble portion including a legacy preamble portion and a high efficiency (HE) preamble portion; and a STA resource allocation portion including information on associated scheduled STA resource allocations, the STA resource allocation portion to use respective frequency bands for respective ones of the associated scheduled STA resource allocations.

Example 39 includes the subject matter of Example 38, and optionally, wherein the HE preamble portion includes a HE signal (SIG) B field (HE-SIG-B), the HE-SIG-B including information on the AP resource allocations.

Example 40 includes the subject matter of Example 39, and optionally, wherein the common preamble portion further includes a HE Short Training Field (HE-STF), a HE Long Training field (HE-LTF).

Example 41 includes the subject matter of Example 40, and optionally, wherein: the STA resource allocation portion includes a Next Generation (NG) signal (SIG) field (NG-SIG), the NG-SIG to be part of the common preamble portion, to be after the HE-SIG-B in a time domain, and further to be one of before or after the HE-STF and the HE-LTF in the time domain; and a payload portion following the common preamble portion, the payload portion including the data.

Example 42 includes the subject matter of Example 33, and optionally, wherein the wireless frame includes: a common preamble portion common to the plurality of APs, the preamble portion including a legacy preamble portion and a high efficiency (HE) preamble portion, the HE preamble portion including: a HE signal (SIG) B field (HE-SIG-B) including information on the AP resource allocations; a HE Short Training Field (HE-STF); and a HE Long Training field (HE-LTF); and a payload portion following the common preamble portion, the payload portion including a STA resource allocation portion that includes information on associated scheduled STA resource allocations.

Example 43 includes the subject matter of Example 33, and optionally, wherein the AP trigger frame further includes information on a duration of DL data frames to be transmitted simultaneously by the plurality of APs as part of the simultaneous DL transmissions.

Example 44 includes the subject matter of Example 43, and optionally, wherein the AP trigger frame further includes information on a duration of acknowledgment frames to be sent by the scheduled STAs to the plurality of APs.

Example 45 includes the subject matter of Example 43, and optionally, wherein the AP trigger frame includes: a common portion common to the plurality of APs, the common portion including a preamble; and an orthogonal frequency division multiple access (OFDMA) AP-specific portion, the OFDMA AP-specific portion including information on AP resource allocations for respective ones of the plurality of APs on respective ones of the AP resource allocations.

Example 46 includes the subject matter of Example 43, and optionally, wherein the AP trigger frame includes: a common portion common to the plurality of APs, the common portion including a preamble; and a spatial-reuse AP-specific portion in the common portion, the spatial-reuse AP-specific portion including information on AP resource allocations for respective ones of the plurality of APs.

Example 47 includes the subject matter of Example 33, and optionally, wherein the wireless frame is an orthogonal frequency division multiple access (OFDMA) frame.

Example 48 includes a wireless communication device comprising: means for decoding an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP); means for causing transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP; means for encoding data for transmission to the associated scheduled STAs based on the corresponding AP resource allocation and on the associated STA resource allocations; and means for causing transmission of the data.

Example 49 includes the subject matter of Example 48, and optionally, wherein the wireless frame includes the data.

Example 50 includes the subject matter of Example 48, and optionally, wherein the wireless frame includes a forwarded version of the AP trigger frame.

Example 51 includes the subject matter of Example 48, and optionally, wherein the wireless frame includes: a common preamble portion common to the plurality of APs, the common preamble portion including a legacy preamble portion and a high efficiency (HE) preamble portion; and an AP resource allocation portion, the AP resource allocation portion including, on a same frequency band, information on AP resource allocations for the plurality of APs.

Example 52 includes the subject matter of Example 48, and optionally, wherein the wireless frame includes: a common preamble portion common to the plurality of APs, the common preamble portion including a legacy preamble portion and a high efficiency (HE) preamble portion; and an AP resource allocation portion including information on the corresponding AP resource allocation, the AP resource allocation portion to use a frequency band relating to the corresponding AP resource allocation.

Example 53 includes the subject matter of Example 48, and optionally, wherein the wireless frame includes: a common preamble portion common to the plurality of APs, the common preamble portion including a legacy preamble portion and a high efficiency (HE) preamble portion; and a STA resource allocation portion including information on associated scheduled STA resource allocations, the STA resource allocation portion to use respective frequency bands for respective ones of the associated scheduled STA resource allocations.

Example 54 includes the subject matter of Example 53, and optionally, wherein the HE preamble portion includes a HE signal (SIG) B field (HE-SIG-B), the HE-SIG-B including information on the AP resource allocations.

Example 55 includes the subject matter of Example 54, and optionally, wherein the common preamble portion further includes a HE Short Training Field (HE-STF), a HE Long Training field (HE-LTF).

Example 56 includes the subject matter of Example 55, and optionally, wherein: the STA resource allocation portion includes a Next Generation (NG) signal (SIG) field (NG-SIG), the NG-SIG to be part of the common preamble portion, to be after the HE-SIG-B in a time domain, and further to be one of before or after the HE-STF and the HE-LTF in the time domain; and a payload portion following the common preamble portion, the payload portion including the data.

Example 57 includes the subject matter of Example 33, and optionally, wherein the wireless frame includes: a common preamble portion common to the plurality of APs, the preamble portion including a legacy preamble portion and a high efficiency (HE) preamble portion, the HE preamble portion including: a HE signal (SIG) B field (HE-SIG-B) including information on the AP resource allocations; a HE Short Training Field (HE-STF); and a HE Long Training field (HE-LTF); and a payload portion following the common preamble portion, the payload portion including a STA resource allocation portion that includes information on associated scheduled STA resource allocations.

Example 58 includes a wireless communication device comprising a memory storing logic, and processing circuitry coupled to the memory, the processing circuitry to execute the logic to: decode a wireless frame addressed to a plurality of STAs, respective groups of the STAs being associated with respective ones of a plurality of access points (APs), the wireless frame including simultaneous downlink (DL) transmissions from the plurality of APs to the plurality of STAs, the wireless frame further including information on resource allocations by a coordinator AP to respective ones of the plurality of APs (AP resource allocations) for simultaneous DL transmissions, and information on respective resource allocations for data transmissions from each of the plurality of APs to respective ones of the groups of STAs (STA resource allocations), decoding including: determining an AP resource allocation of an AP associated with a STA that corresponds to the device; and within the AP resource allocation, decoding a STA resource allocation for the STA that corresponds to the device; decoding data in the data transmissions based on the AP resource allocation and on the associated STA resource allocation; and in response to decoding the data, cause transmission of an uplink (UL) acknowledgment frame to the AP associated with the STA that corresponds to the device.

Example 59 includes the subject matter of Example 58, and optionally, wherein the wireless frame includes the data.

Example 60 includes the subject matter of Example 58, and optionally, wherein the wireless frame includes a forwarded version of an AP trigger frame from the coordinator AP to the plurality of APs.

Example 61 includes the subject matter of Example 58, and optionally, wherein the wireless frame includes: a common preamble portion common to the plurality of APs, the common preamble portion including a legacy preamble portion and a high efficiency (HE) preamble portion; and an AP resource allocation portion, the AP resource allocation portion including, on a same frequency band, information on AP resource allocations for the plurality of APs.

Example 62 includes the subject matter of Example 58, and optionally, wherein the wireless frame includes: a common preamble portion common to the plurality of APs, the common preamble portion including a legacy preamble portion and a high efficiency (HE) preamble portion; and an AP resource allocation portion including information on the corresponding AP resource allocation, the AP resource allocation portion to use a frequency band relating to the corresponding AP resource allocation.

Example 63 includes the subject matter of Example 58, and optionally, wherein the wireless frame includes: a common preamble portion common to the plurality of APs, the common preamble portion including a legacy preamble portion and a high efficiency (HE) preamble portion; and a STA resource allocation portion including information on associated scheduled STA resource allocations, the STA resource allocation portion to use respective frequency bands for respective ones of the associated scheduled STA resource allocations.

Example 64 includes the subject matter of Example 63, and optionally, wherein the HE preamble portion includes a HE signal (SIG) B field (HE-SIG-B), the HE-SIG-B including information on the AP resource allocations.

Example 65 includes the subject matter of Example 64, and optionally, wherein the common preamble portion further includes a HE Short Training Field (HE-STF), a HE Long Training field (HE-LTF).

Example 66 includes the subject matter of Example 65, and optionally, wherein: the STA resource allocation portion includes a Next Generation (NG) signal (SIG) field (NG-SIG), the NG-SIG to be part of the common preamble portion, to be after the HE-SIG-B in a time domain, and further to be one of before or after the HE-STF and the HE-LTF in the time domain; and a payload portion following the common preamble portion, the payload portion including the data.

Example 67 includes the subject matter of Example 58, and optionally, wherein the wireless frame includes: a common preamble portion common to the plurality of APs, the preamble portion including a legacy preamble portion and a high efficiency (HE) preamble portion, the HE preamble portion including: a HE signal (SIG) B field (HE-SIG-B) including information on the AP resource allocations; a HE Short Training Field (HE-STF); and a HE Long Training field (HE-LTF); and a payload portion following the common preamble portion, the payload portion including a STA resource allocation portion that includes information on associated scheduled STA resource allocations.

Example 68 includes a product comprising one or more tangible computer-readable non-transitory storage media comprising computer-executable instructions operable to, when executed by at least one computer processor, enable the at least one computer processor to implement operations at a wireless communication device, the operations comprising: encoding a wireless frame addressed to a plurality of STAs, respective groups of the STAs being associated with respective ones of a plurality of access points (APs), the wireless frame including simultaneous downlink (DL) transmissions from the plurality of APs to the plurality of STAs, the wireless frame further including information on resource allocations by a coordinator AP to respective ones of the plurality of APs (AP resource allocations) for simultaneous DL transmissions, and information on respective resource allocations for data transmissions from each of the plurality of APs to respective ones of the groups of STAs (STA resource allocations), decoding including: determining an AP resource allocation of an AP associated with a STA that corresponds to the device; and within the AP resource allocation, decoding a STA resource allocation for the STA that corresponds to the device; decoding data in the data transmissions based on the AP resource allocation and on the associated STA resource allocation; and causing transmission of an uplink (UL) acknowledgment frame to the AP associated with the STA that corresponds to the device.

Example 69 includes the subject matter of Example 68, and optionally, wherein the wireless frame includes the data.

Example 70 includes the subject matter of Example 68, and optionally, wherein the wireless frame includes a forwarded version of an AP trigger frame from the coordinator AP to the plurality of APs.

Example 71 includes the subject matter of Example 68, and optionally, wherein the wireless frame includes: a common preamble portion common to the plurality of APs, the common preamble portion including a legacy preamble portion and a high efficiency (HE) preamble portion; and an AP resource allocation portion, the AP resource allocation portion including, on a same frequency band, information on AP resource allocations for the plurality of APs.

Example 72 includes the subject matter of Example 68, and optionally, wherein the wireless frame includes: a common preamble portion common to the plurality of APs, the common preamble portion including a legacy preamble portion and a high efficiency (HE) preamble portion; and an AP resource allocation portion including information on the corresponding AP resource allocation, the AP resource allocation portion to use a frequency band relating to the corresponding AP resource allocation.

Example 73 includes the subject matter of Example 68, and optionally, wherein the wireless frame includes: a common preamble portion common to the plurality of APs, the common preamble portion including a legacy preamble portion and a high efficiency (HE) preamble portion; and a STA resource allocation portion including information on associated scheduled STA resource allocations, the STA resource allocation portion to use respective frequency bands for respective ones of the associated scheduled STA resource allocations.

Example 74 includes the subject matter of Example 73, and optionally, wherein the HE preamble portion includes a HE signal (SIG) B field (HE-SIG-B), the HE-SIG-B including information on the AP resource allocations.

Example 75 includes the subject matter of Example 74, and optionally, wherein the common preamble portion further includes a HE Short Training Field (HE-STF), a HE Long Training field (HE-LTF).

Example 76 includes the subject matter of Example 75, and optionally, wherein: the STA resource allocation portion includes a Next Generation (NG) signal (SIG) field (NG-SIG), the NG-SIG to be part of the common preamble portion, to be after the HE-SIG-B in a time domain, and further to be one of before or after the HE-STF and the HE-LTF in the time domain; and a payload portion following the common preamble portion, the payload portion including the data.

Example 77 includes the subject matter of Example 68, and optionally, wherein the wireless frame includes: a common preamble portion common to the plurality of APs, the preamble portion including a legacy preamble portion and a high efficiency (HE) preamble portion, the HE preamble portion including: a HE signal (SIG) B field (HE-SIG-B) including information on the AP resource allocations; a HE Short Training Field (HE-STF); and a HE Long Training field (HE-LTF); and a payload portion following the common preamble portion, the payload portion including a STA resource allocation portion that includes information on associated scheduled STA resource allocations.

Example 78 is a method to be performed at a wireless communication device, the method including: decoding a wireless frame addressed to a plurality of STAs, respective groups of the STAs being associated with respective ones of a plurality of access points (APs), the wireless frame including simultaneous downlink (DL) transmissions from the plurality of APs to the plurality of STAs, the wireless frame further including information on resource allocations by a coordinator AP to respective ones of the plurality of APs (AP resource allocations) for simultaneous DL transmissions, and information on respective resource allocations for data transmissions from each of the plurality of APs to respective ones of the groups of STAs (STA resource allocations), decoding including: determining an AP resource allocation of an AP associated with a STA that corresponds to the device; and within the AP resource allocation, decoding a STA resource allocation for the STA that corresponds to the device; decoding data in the data transmissions based on the AP resource allocation and on the associated STA resource allocation; and causing transmission of an uplink (UL) acknowledgment frame to the AP associated with the STA that corresponds to the device.

Example 79 includes the subject matter of Example 78, and optionally, wherein the wireless frame includes the data.

Example 80 includes the subject matter of Example 78, and optionally, wherein the wireless frame includes a forwarded version of an AP trigger frame from the coordinator AP to the plurality of APs.

Example 81 includes the subject matter of Example 78, and optionally, wherein the wireless frame includes: a common preamble portion common to the plurality of APs, the common preamble portion including a legacy preamble portion and a high efficiency (HE) preamble portion; and an AP resource allocation portion, the AP resource allocation portion including, on a same frequency band, information on AP resource allocations for the plurality of APs.

Example 82 includes the subject matter of Example 78, and optionally, wherein the wireless frame includes: a common preamble portion common to the plurality of APs, the common preamble portion including a legacy preamble portion and a high efficiency (HE) preamble portion; and an AP resource allocation portion including information on the corresponding AP resource allocation, the AP resource allocation portion to use a frequency band relating to the corresponding AP resource allocation.

Example 83 includes the subject matter of Example 78, and optionally, wherein the wireless frame includes: a common preamble portion common to the plurality of APs, the common preamble portion including a legacy preamble portion and a high efficiency (HE) preamble portion; and a STA resource allocation portion including information on associated scheduled STA resource allocations, the STA resource allocation portion to use respective frequency bands for respective ones of the associated scheduled STA resource allocations.

Example 84 includes the subject matter of Example 83, and optionally, wherein the HE preamble portion includes a HE signal (SIG) B field (HE-SIG-B), the HE-SIG-B including information on the AP resource allocations.

Example 85 includes the subject matter of Example 84, and optionally, wherein the common preamble portion further includes a HE Short Training Field (HE-STF), a HE Long Training field (HE-LTF).

Example 86 includes the subject matter of Example 85, and optionally, wherein: the STA resource allocation portion includes a Next Generation (NG) signal (SIG) field (NG-SIG), the NG-SIG to be part of the common preamble portion, to be after the HE-SIG-B in a time domain, and further to be one of before or after the HE-STF and the HE-LTF in the time domain; and a payload portion following the common preamble portion, the payload portion including the data.

Example 87 includes the subject matter of Example 78, and optionally, wherein the wireless frame includes: a common preamble portion common to the plurality of APs, the preamble portion including a legacy preamble portion and a high efficiency (HE) preamble portion, the HE preamble portion including: a HE signal (SIG) B field (HE-SIG-B) including information on the AP resource allocations; a HE Short Training Field (HE-STF); and a HE Long Training field (HE-LTF); and a payload portion following the common preamble portion, the payload portion including a STA resource allocation portion that includes information on associated scheduled STA resource allocations.

An Abstract is provided. It is submitted with the understanding that it will not be used to limit or interpret the scope or meaning of the claims. The following claims are hereby incorporated into the detailed description, with each claim standing on its own as a separate embodiment.

What is claimed is:

1. A wireless communication device comprising a memory storing logic, and processing circuitry coupled to the memory, the processing circuitry to execute the logic to:
decode an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP);

cause transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP, wherein the wireless frame includes:

a common preamble portion common to the plurality of APs, the common preamble portion including a legacy preamble portion and a high efficiency (HE) preamble portion, the HE preamble portion including a HE signal (SIG) B field (HE-SIG-B), the HE-SIG-B including information on the AP resource allocations, the common preamble portion including a HE Short Training Field (HE-STF), and a HE Long Training field (HE-LTF);

a STA resource allocation portion including information on associated scheduled STA resource allocations, the STA resource allocation portion to use respective frequency bands for respective ones of the associated scheduled STA resource allocations, the STA resource allocation portion further including a Next Generation (NG) signal (SIG) field (NG-SIG), the NG-SIG being part of the common preamble portion, and to be after the HE-SIG-B in a time domain, and further to be before the HE-STF and the HE-LTF in the time domain; and a payload portion following the common preamble portion, the payload portion including the DL data and being based on the corresponding AP resource allocation and on the associated STA resource allocations.

2. The wireless communication device of claim 1, wherein the wireless frame includes:
an AP resource allocation portion, the AP resource allocation portion including, on a same frequency band, information on AP resource allocations for the plurality of APs.

3. The wireless communication device of claim 1, wherein the wireless frame includes:
an AP resource allocation portion including information on the corresponding AP resource allocation, the AP resource allocation portion to use a frequency band relating to the corresponding AP resource allocation.

4. The wireless communication device of claim 1, wherein the payload portion includes:
the information on the associated scheduled STA resource allocations.

5. The wireless communication device of claim 1, wherein the wireless frame is an orthogonal frequency division multiple access (OFDMA) frame.

6. The wireless communication device of claim 1, further including a radio integrated circuit coupled to the processing circuitry, and a front-end module coupled to the radio integrated circuit.

7. The wireless communication device of claim 6, further including a plurality of antennas coupled to the front-end module.

8. A product comprising one or more non-transitory computer-readable storage media comprising computer-executable instructions operable to, when executed by at least one computer processor, enable the at least one computer processor to implement operations at a wireless communication device, the operations comprising:

decoding an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP);

causing transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP, wherein the wireless frame includes:

a common preamble portion common to the plurality of APs, the common preamble portion including a legacy preamble portion and a high efficiency (HE) preamble portion, the HE preamble portion including a HE signal (SIG) B field (HE-SIG-B), the HE-SIG-B including information on the AP resource allocations, the common preamble portion including a HE Short Training Field (HE-STF), and a HE Long Training field (HE-LTF);

a STA resource allocation portion including information on associated scheduled STA resource allocations, the STA resource allocation portion to use respective frequency bands for respective ones of the associated scheduled STA resource allocations, the STA resource allocation portion further including a Next Generation (NG) signal (SIG) field (NG-SIG), the NG-SIG being part of the common preamble portion, and to be after the HE-SIG-B in a time domain, and further to be before the HE-STF and the HE-LTF in the time domain; and a payload portion following the common preamble portion, the payload portion including the DL data and being based on the corresponding AP resource allocation and on the associated STA resource allocations.

9. The product of claim 8, wherein the wireless frame includes:
an AP resource allocation portion, the AP resource allocation portion including, on a same frequency band, information on AP resource allocations for the plurality of APs.

10. The product of claim 8, wherein the wireless frame includes:
an AP resource allocation portion including information on the corresponding AP resource allocation, the AP resource allocation portion to use a frequency band relating to the corresponding AP resource allocation.

11. The product of claim 8, wherein the payload portion includes:
the information on the associated scheduled STA resource allocations.

12. A wireless communication device comprising:
means for decoding an access point (AP) trigger frame from a coordinator AP, the AP trigger frame including information on respective resource allocations to a plurality of APs (AP resource allocations) for simultaneous downlink (DL) data transmissions from the plurality of APs to a plurality of wireless stations (scheduled STAs), the plurality of APs including the coordinator AP and an AP corresponding to the wireless communication device (corresponding AP);

means for causing transmission of a wireless frame to a plurality of scheduled STAs associated with the corresponding AP (associated scheduled STAs), the wireless frame including information on a resource allocation by the coordinator AP to the corresponding AP (corresponding AP resource allocation) for the simultaneous DL transmissions, and information on respective resource allocations to the associated scheduled STAs (associated scheduled STA resource allocations) for data transmission from the corresponding AP, wherein the wireless frame includes:

a common preamble portion common to the plurality of APs, the common preamble portion including a legacy preamble portion and a high efficiency (HE) preamble portion, the HE preamble portion including a HE signal (SIG) B field (HE-SIG-B), the HE-SIG-B including information on the AP resource allocations, the common preamble portion including a HE Short Training Field (HE-STF), and a HE Long Training field (HE-LTF);

a STA resource allocation portion including information on associated scheduled STA resource allocations, the STA resource allocation portion to use respective frequency bands for respective ones of the associated scheduled STA resource allocations, the STA resource allocation portion further including a Next Generation (NG) signal (SIG) field (NG-SIG), the NG-SIG being part of the common preamble portion, and to be after the HE-SIG-B in a time domain, and further to be before the HE-STF and the HE-LTF in the time domain; and a payload portion following the common preamble portion, the payload portion including the DL data and being based on the corresponding AP resource allocation and on the associated STA resource allocations.

13. The wireless communication device of claim 12, wherein the wireless frame includes:

an AP resource allocation portion, the AP resource allocation portion including, on a same frequency band, information on AP resource allocations for the plurality of APs.

14. The wireless communication device of claim 12, wherein the wireless frame includes:

an AP resource allocation portion including information on the corresponding AP resource allocation, the AP resource allocation portion to use a frequency band relating to the corresponding AP resource allocation.

\* \* \* \* \*